US011949310B2

(12) United States Patent
Hashimoto et al.

(10) Patent No.: US 11,949,310 B2
(45) Date of Patent: Apr. 2, 2024

(54) VIBRATION ACTUATOR WITH MOVABLE BODY WITH TIP PART OF THE CORE OSCILLATING AND A SHAFT PART SUPPORTING THE MOVABLE BODY ON A SIDE OF A BASE

(71) Applicants: Katsuhiro Hashimoto, Tokyo (JP); Takanori Kato, Tokyo (JP); Yuki Takahashi, Tokyo (JP)

(72) Inventors: Katsuhiro Hashimoto, Tokyo (JP); Takanori Kato, Tokyo (JP); Yuki Takahashi, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 198 days.

(21) Appl. No.: 17/148,623

(22) Filed: Jan. 14, 2021

(65) Prior Publication Data
US 2021/0218324 A1 Jul. 15, 2021

(30) Foreign Application Priority Data
Jan. 15, 2020 (JP) ................................. 2020-004739

(51) Int. Cl.
*H02K 33/18* (2006.01)
*B06B 1/04* (2006.01)

(52) U.S. Cl.
CPC .............. *H02K 33/18* (2013.01); *B06B 1/045* (2013.01)

(58) Field of Classification Search
CPC ........ H02K 33/00; H02K 33/02; H02K 33/04; H02K 33/06; H02K 35/02; H02K 35/00; H02K 35/04; H02K 33/18; H02K 33/16; H02K 3/26; H02K 15/02; H02N 2/188

USPC ........ 310/28–36, 12.12, 12.15, 12.01, 15–29
See application file for complete search history.

(56) References Cited

U.S. PATENT DOCUMENTS

| | | | | |
|---|---|---|---|---|
| 4,135,119 A | * | 1/1979 | Brosens | .................. H01F 7/145 318/128 |
| 5,180,939 A | * | 1/1993 | Rosswurm | ............ F02G 1/0435 290/1 R |
| 6,405,599 B1 | * | 6/2002 | Patt | .......................... G01N 3/02 73/779 |
| 7,554,225 B2 | * | 6/2009 | Kraus | .................... H02K 33/18 310/15 |

(Continued)

FOREIGN PATENT DOCUMENTS

| | | |
|---|---|---|
| JP | H02-193562 | 7/1990 |
| JP | 2007-111619 | 5/2007 |

(Continued)

OTHER PUBLICATIONS

European Search Report and the European Search Opinion dated Jun. 9, 2021 From the European Patent Office Re. Application No. 21151564.8. (9 Pages).

*Primary Examiner* — Maged M Almawri

(57) ABSTRACT

A vibration actuator includes: a movable body including a core around which a coil is wound in a state in which a tip part of the core is exposed; a fixed body including one or more magnets disposed away from and facing the tip part of the core; and a shaft part rotatably supporting the movable body on a side of a base end part of the core, and generates vibration by oscillation of the tip part of the core around the shaft part with respect to the one or more magnets by cooperation among the coil, the core and the one or more magnets.

12 Claims, 20 Drawing Sheets

(56) References Cited

U.S. PATENT DOCUMENTS

| | | | | |
|---|---|---|---|---|
| 7,569,952 | B1* | 8/2009 | Bono | H02K 35/02 310/15 |
| 7,808,236 | B1* | 10/2010 | Huang | H10N 30/00 324/249 |
| 8,080,906 | B2* | 12/2011 | Roberts | H02K 35/06 310/20 |
| 8,432,049 | B2* | 4/2013 | Jung | F03D 5/00 336/200 |
| 8,629,569 | B2* | 1/2014 | Roberts | H02K 35/06 290/1 R |
| 8,994,235 | B2* | 3/2015 | Doll | H02K 16/02 310/38 |
| 9,121,875 | B2* | 9/2015 | Fukada | G01R 29/12 |
| 10,160,010 | B2* | 12/2018 | Chun | H02K 33/16 |
| 10,468,928 | B2* | 11/2019 | Jiang | H02K 1/34 |
| 2004/0150277 | A1* | 8/2004 | Moriyasu | H02K 33/18 310/15 |
| 2005/0140219 | A1* | 6/2005 | Sanematsu | H02K 33/16 310/15 |
| 2005/0185241 | A1* | 8/2005 | Johnson | H02K 33/02 359/227 |
| 2005/0230973 | A1* | 10/2005 | Fripp | H02K 35/04 290/1 R |
| 2006/0175909 | A1* | 8/2006 | Kraus | B26B 19/282 310/12.31 |
| 2006/0255664 | A1* | 11/2006 | Kraus | H02K 33/16 310/36 |
| 2006/0255665 | A1* | 11/2006 | Kraus | H02K 33/18 310/36 |
| 2007/0040457 | A1* | 2/2007 | Shimizu | H02K 33/06 310/15 |
| 2007/0085425 | A1* | 4/2007 | Hirashima | H02K 33/16 310/15 |
| 2007/0164616 | A1* | 7/2007 | Kuwabara | B06B 1/045 310/15 |
| 2008/0278008 | A1* | 11/2008 | Roberts | H02K 35/06 310/29 |
| 2010/0277010 | A1 | 11/2010 | Jeon | |
| 2010/0289359 | A1* | 11/2010 | Knaian | H02K 21/44 310/195 |
| 2011/0101796 | A1* | 5/2011 | Odajima | H02K 33/16 310/25 |
| 2011/0133577 | A1* | 6/2011 | Lee | H02K 33/18 310/15 |
| 2011/0198945 | A1* | 8/2011 | Nakagawa | H02K 33/16 310/12.25 |
| 2012/0119596 | A1* | 5/2012 | Doll | H02K 16/02 310/36 |
| 2014/0054980 | A1* | 2/2014 | Andrikowich | H02K 7/14 310/12.31 |
| 2015/0137627 | A1* | 5/2015 | Katada | H02K 33/16 310/25 |
| 2016/0006332 | A1* | 1/2016 | Liao | H02K 33/16 310/29 |
| 2016/0190902 | A1* | 6/2016 | Skidmore | H02K 33/16 310/36 |
| 2016/0211734 | A1* | 7/2016 | Wang | H02K 33/16 |
| 2016/0314923 | A1* | 10/2016 | Tsuneyoshi | H02K 7/1876 |
| 2016/0359401 | A1* | 12/2016 | Deak, Sr. | H02K 35/02 |
| 2017/0033655 | A1* | 2/2017 | Wang | H02K 33/16 |
| 2018/0131371 | A1* | 5/2018 | Liu | H02K 5/04 |
| 2018/0183300 | A1* | 6/2018 | Fukumoto | H02K 35/02 |
| 2018/0191232 | A1* | 7/2018 | Zou | H02K 35/02 |
| 2018/0301969 | A1* | 10/2018 | Takahashi | H04M 19/04 |
| 2018/0316244 | A1* | 11/2018 | Fukumoto | H02K 7/1861 |
| 2018/0342938 | A1* | 11/2018 | Fei | B63H 1/36 |
| 2019/0229601 | A1* | 7/2019 | Liao | H02K 7/003 |
| 2019/0305659 | A1* | 10/2019 | Kitahara | H02K 33/18 |
| 2019/0386552 | A1 | 12/2019 | Takahashi et al. | |
| 2020/0076627 | A1* | 3/2020 | Takahashi | H02K 33/06 |
| 2020/0076288 | A1* | 3/2020 | Nerubenko | F16F 7/1005 |
| 2021/0135543 | A1* | 5/2021 | Deak, Sr. | H02K 1/34 |
| 2022/0311320 | A1* | 9/2022 | Kurita | H02K 33/16 |
| 2023/0275497 | A1* | 8/2023 | Wakabayashi | B06B 1/045 318/128 |

FOREIGN PATENT DOCUMENTS

| | | |
|---|---|---|
| JP | 2010-221101 | 10/2010 |
| JP | 2010-260043 | 11/2010 |
| JP | 4875133 | 12/2011 |
| WO | WO 2018/117066 | 6/2018 |

* cited by examiner

VIBRATION ACTUATOR WITH MOVABLE BODY WITH TIP PART OF THE CORE OSCILLATING AND A SHAFT PART SUPPORTING THE MOVABLE BODY ON A SIDE OF A BASE

CROSS REFERENCE TO RELATED APPLICATIONS

This application is entitled to (or claims) the benefit of Japanese Patent Application No. 2020-004739, filed on Jan. 15, 2020, the disclosure of which including the specification, drawings and abstract is incorporated herein by reference in its entirety.

TECHNICAL FIELD

The present invention relates to a vibration actuator and an electronic apparatus including the vibration actuator.

BACKGROUND ART

In the related art, a vibration actuator is mounted on an electronic apparatus, as a vibration generation source for notifying an incoming call or for improving a feeling of operation on a touch screen or realism of an amusement device such as a controller of a game machine by transmitting vibration to a finger, a thumb, a limb, or the like. Note that, examples of the electronic apparatus include a portable communication terminal such as a mobile phone or a smartphone, a portable information terminal such as a tablet PC, a portable game terminal, a controller (gamepad) of a stationary game machine, and a wearable terminal attached to clothes, an arm, or the like.

The vibration actuator disclosed in Patent Literature (hereinafter, referred to as "PTL") 1 is a linear actuator including a fixed body including a coil, a movable body including a magnet, and a coil spring disposed between the fixed body and the movable body. This vibration actuator generates vibration by causing the movable body to linearly reciprocate along a shaft by utilizing a driving force of a voice coil motor composed of the coil and the magnet. The vibration actuator is mounted such that the vibration direction is parallel to the main surface of an electronic apparatus, and transmits to vibration in a direction along a body surface of a user which comes into contact with the electronic apparatus, to the body surface.

In such a vibration actuator, a desired vibration is generated by energizing a coil with a current of a predetermined frequency to cause a coil spring to resonate.

In recent years, it has been considered that various vibrations are generated as vibrations to be generated by a vibration actuator, such as similar vibrations are generated by using two currents of different frequencies in the case of energization of both the currents.

In contrast, the vibration generator of PTL 2 realizes vibrations with two resonance points by using a movable body including two vibrators having different masses and two types of plate springs having different spring constants, thereby widening a frequency band in which vibration is possible, and generating various vibrations.

CITATION LIST

Patent Literature

PTL 1
Japanese Patent No. 4875133

PTL 2
Japanese Patent Application Laid-Open No. 2007-111619

SUMMARY OF INVENTION

Technical Problem

However, this vibration generator of PTL 2 has problems that, due to the use of two vibrators and two types of plate springs, the number of components is large and the vibration generator can only be configured as a large-size one.

An object of the present invention is to provide a vibration actuator and an electronic apparatus which are capable of achieving a decrease in the number of components and a reduction in size, which widen a frequency band in which vibration can be generated, and which are capable of giving, even when currents of different frequencies are energized, sufficient physically-felt vibration to a user in accordance of each current.

Solution to Problem

In order to achieve the object described above, the present invention provides a vibration actuator including:
a movable body including a core around which a coil is wound in a state in which a tip part of the core is exposed;
a fixed body including one or more magnets disposed away from and facing the tip part of the core; and
a shaft part rotatably supporting the movable body on a side of a base end part of the core, the vibration actuator generating vibration by oscillation of the tip part of the core around the shaft part with respect to the one or more magnets by cooperation among the coil, the core and the one or more magnets, the vibration actuator having a configuration in which:
the one or more magnets are arranged in an oscillation direction of the movable body, each of the one or more magnets including two magnetic poles magnetized in a direction facing the tip part of the core, the one or more magnets and the core forming a magnetic spring that energizes the tip part of the core to be located at a position facing a switching position of the two magnetic poles, the former position serving as a reference position, and
the core and the one or more magnets are disposed such that the magnetic spring has a spring constant that is largest when the tip part of the core is located at the reference position with respect to the one or more magnets, the spring constant becoming smaller as the tip part of the core becomes away from the reference position by oscillation.

The present invention provides a vibration actuator including:
a movable body including a core around which a coil is wound in a state in which a tip part of the core is exposed;
a fixed body including one or more magnets disposed away from and facing the tip part of the core; and
a shaft part rotatably supporting the movable body on a side of a base end part of the core, the vibration actuator generating vibration by oscillation of the tip part of the core around the shaft part with respect to the one or more magnets by cooperation among the coil, the core and the one or more magnets, the vibration actuator having a configuration in which:

the one or more magnets are arranged in an oscillation direction of the movable body, each of the one or more magnets including two magnetic poles magnetized in a direction facing the tip part of the core, the one or more magnets and the core forming a magnetic spring that energizes the tip part of the core to be located at a position facing a switching position of the two magnetic poles, the former position serving as a reference position, and the core and the one or more magnets are disposed such that the magnetic spring has a spring constant that is smallest when the tip part of the core is located at the reference position with respect to the one or more magnets, the spring constant becoming larger as the tip part of the core becomes away from the reference position by oscillation.

The present invention has a configuration in which the vibration actuator described above is mounted.

Advantageous Effects of Invention

According to the present invention, it is possible to achieve a decrease in the number of components and a reduction in size, to widen a frequency band in which vibration can be generated, and to give, even when currents of different frequencies are energized, sufficient physically-felt vibration to a user in accordance of each current.

DESCRIPTION OF EMBODIMENTS

Hereinafter, embodiments of the present invention will be described in detail with reference to the accompanying drawings.

Embodiment 1

First, an overall configuration of a vibration actuator according to the present embodiment will be described.

[Overall Configuration of Vibration Actuator 1]

Figure 1:
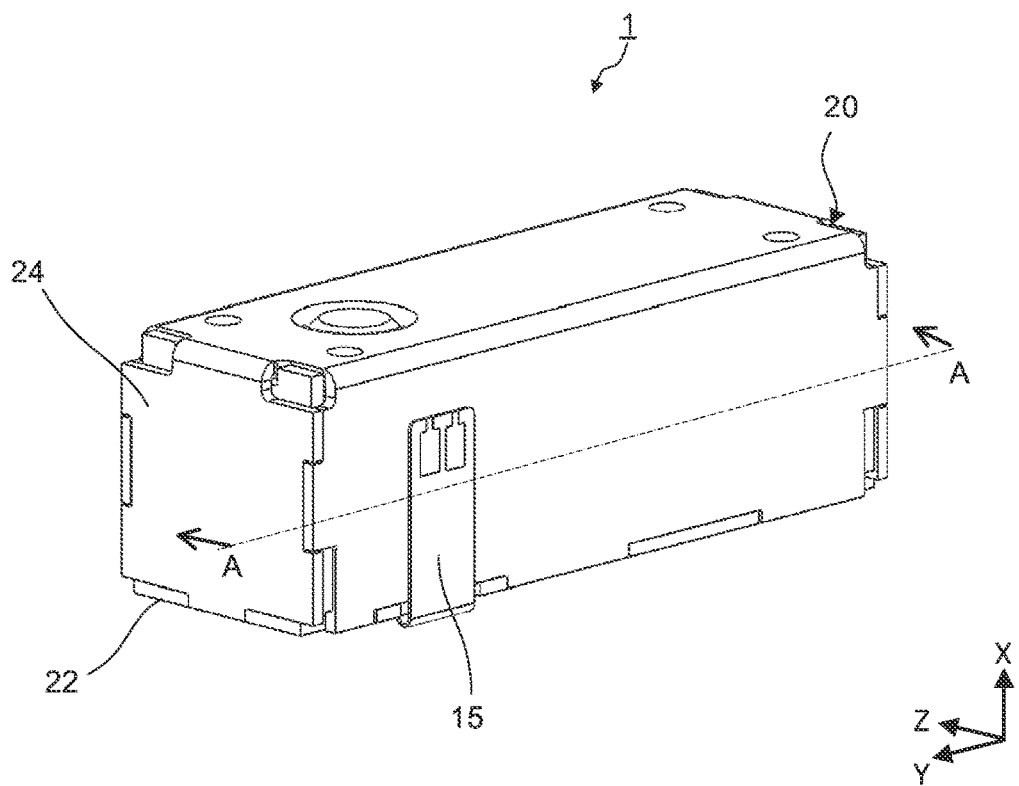
FIG. 1 is a perspective view of an external appearance of a vibration actuator according to Embodiment 1 of the present invention.
Figure 2:
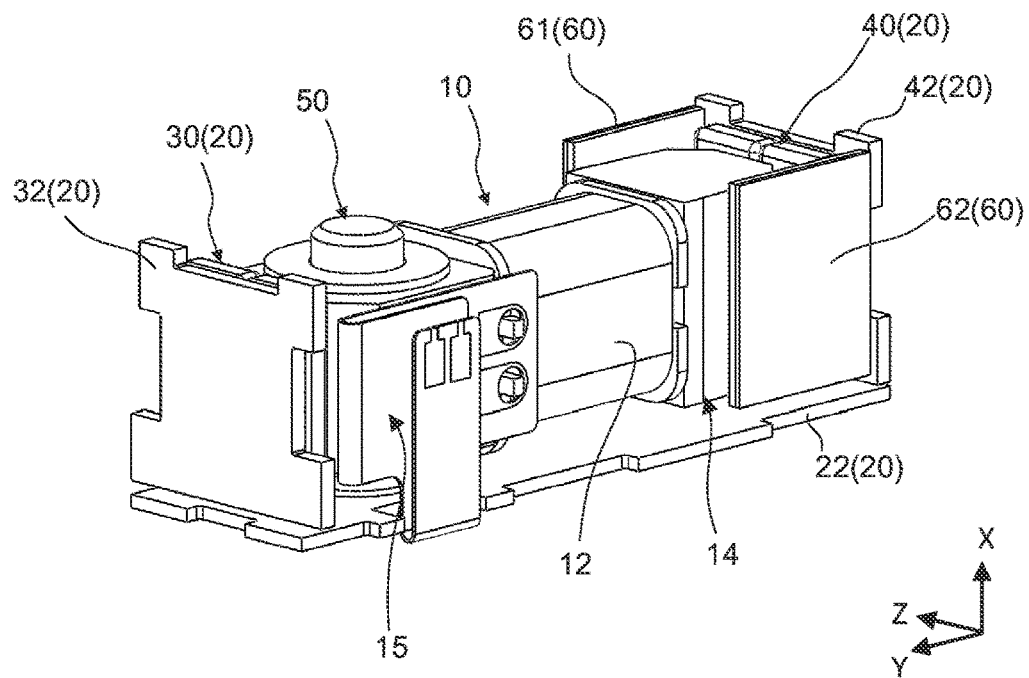
FIG. 2 is a perspective view of the vibration actuator in a state in which a cover of the vibration actuator is removed.
Figure 3:
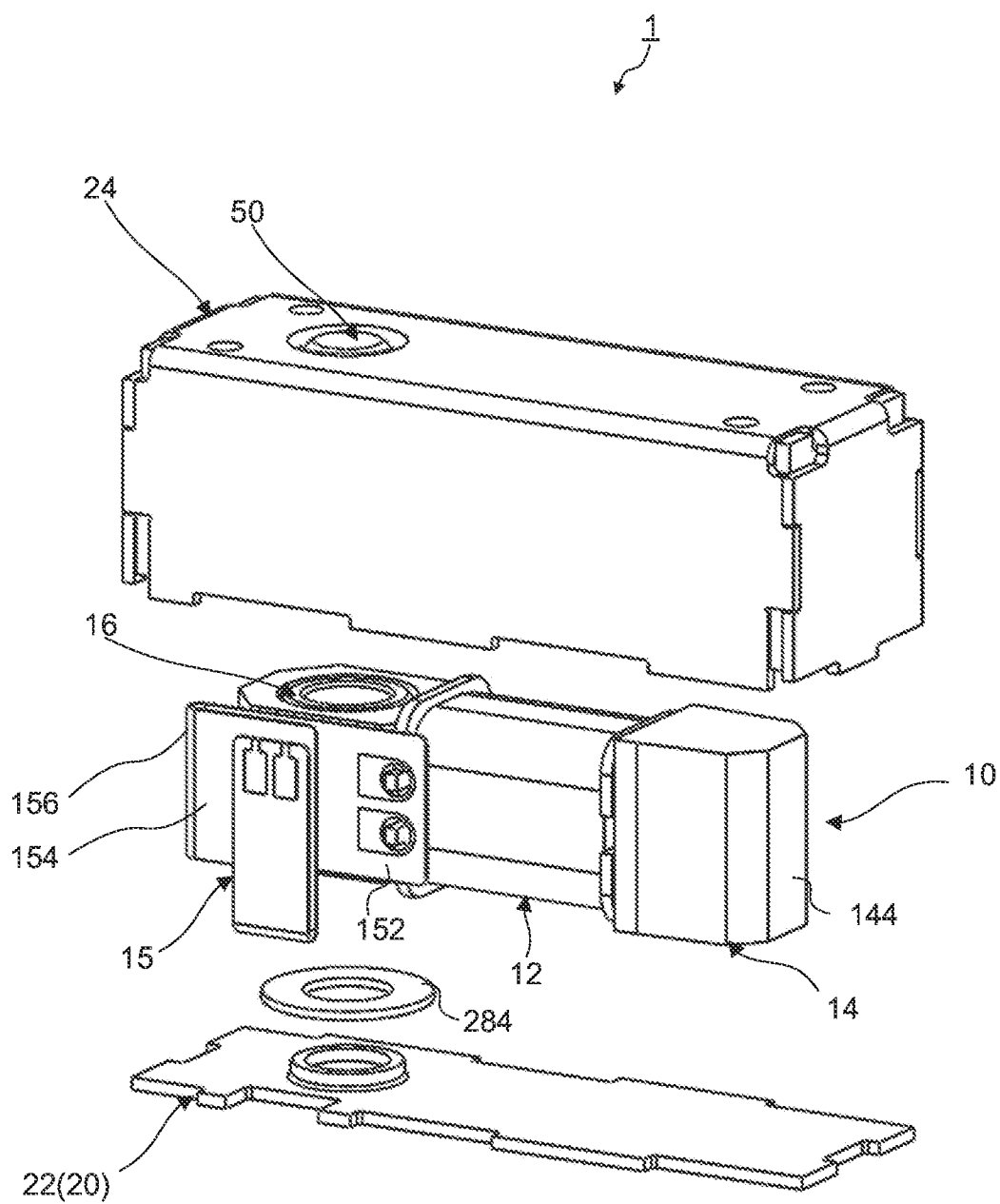
FIG. 3 is an exploded perspective view of the vibration actuator in which a movable body is illustrated.
Figure 4:
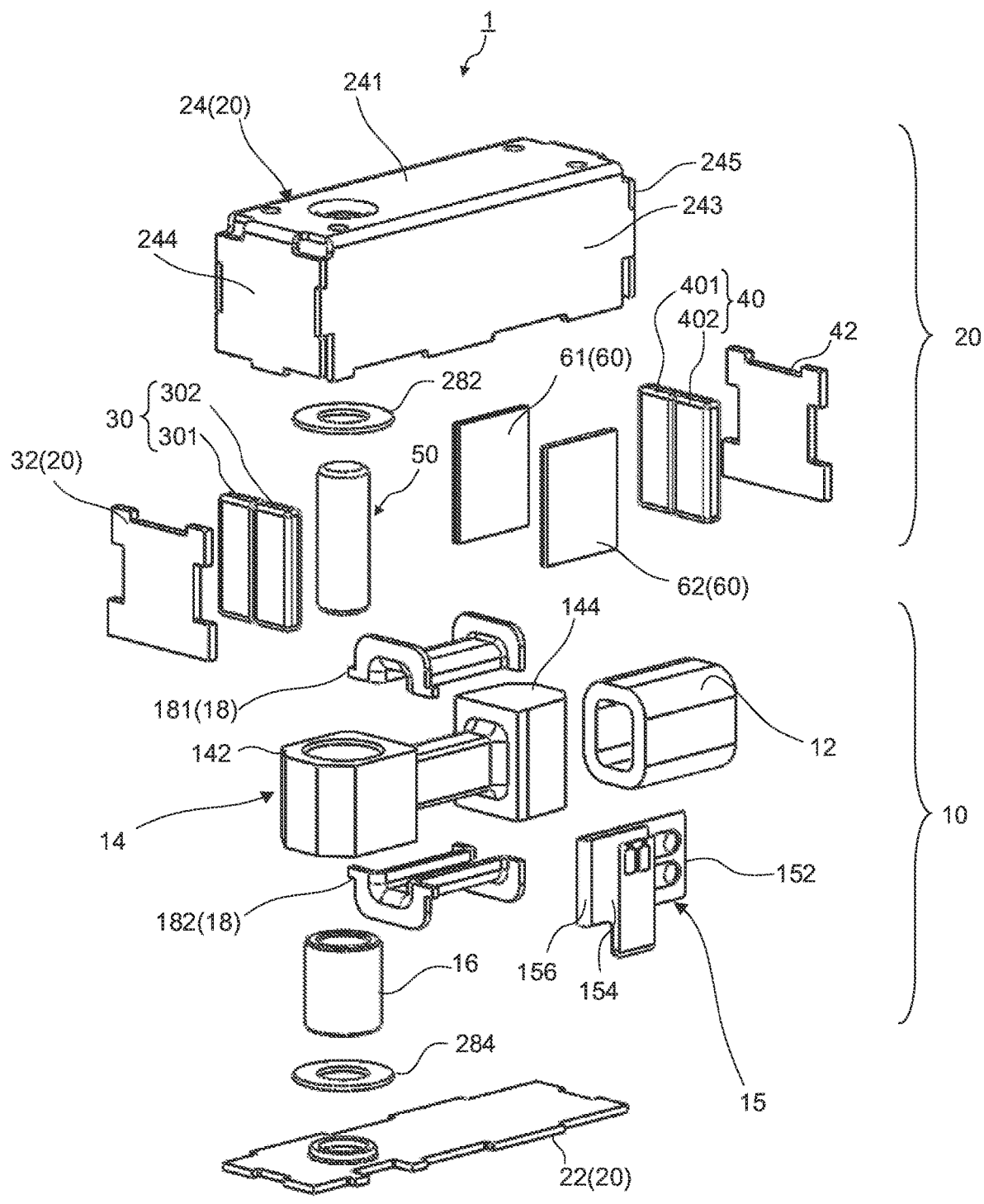
FIG. 4 is an exploded perspective view of the vibration actuator.

FIG. 1 is a perspective view of an external appearance of a vibration actuator according to Embodiment 1 of the present invention. FIG. 2 is a perspective view of the vibration actuator in a state in which a cover of the vibration actuator is removed. FIG. 3 is an exploded perspective view of the vibration actuator in which a movable body is illustrated.

In the present embodiment, an orthogonal coordinate system (X, Y, Z) will be used for explanation. The drawings described later (including the drawings used for describing Variation 1 of Embodiment 1 and Embodiment 2 as well) are also illustrated with the common orthogonal coordinate system (X, Y, Z). Hereinafter, the width, depth, and height of vibration actuator 1 are lengths in X, Y, and Z directions, respectively. For convenience, the vibration actuator of the present embodiment is illustrated in a state in which the Z direction is disposed toward a lateral direction in FIGS. 1 to 4, and will be described with the Z direction (a plus side in the Z direction and a minus side in the Z direction) as a vibration direction (oscillation direction). Further, a "side of the movable body" in the present embodiment means a radiation direction orthogonal to the Z direction around the movable body, and means the X direction, the −X direction, and the Y direction around the movable body in the present embodiment. In addition, the plus side in the Z direction may be set as an upper side, and the minus side in the Z direction may be set as a lower side.

Vibration actuator 1 is mounted as a vibration generation source on an electronic apparatus such as game apparatus GC, smartphone SP and wearable terminal W (see FIGS. 21 to 23), and realizes a vibration function of the electronic apparatus. Vibration actuator 1 is driven to vibrate, for example, in the case of giving a feeling of operation or realism to a user or notifying a user of an incoming call. For example, vibration actuator 1 is mounted such that a vibration transmitting surface of an electronic apparatus which comes into contact with a user is parallel to the XY plane. The vibration transmitting surface is a surface with which a body surface, such as a finger, a thumb or the like, of a user comes into contact (a surface on which an operation button or the like is disposed, or a rear surface on which another finger or the like abuts) in the case of a game controller, and the vibration transmitting surface is a touch screen surface in the case of a smartphone or a tablet terminal. Further, in a wearable terminal attached to a user's clothes, arm or the like, the vibration transmitting surface is an outer surface that comes into contact with the clothes or arm (inner peripheral surface 208 indicated in FIG. 23).

As illustrated in FIGS. 1 to 4, vibration actuator 1 includes movable body 10, shaft part 50, and fixed body 20. Movable body 10 is supported by fixed body 20 via shaft part 50. In the present embodiment, movable body 10 is rotatably supported by fixed body 20 such that a side of another end of movable body 10 reciprocates (oscillates), that is, vibrates while shaft part 50 inserted through movable body 10 on a side of one end thereof serves as a fulcrum.

Movable body 10 is a part that vibrates (oscillates) during driving. In the present embodiment, movable body 10 includes coil 12, and core 14 around which coil 12 is wound. Fixed body 20 includes one or more magnets (first magnet 30 and second magnet 40).

Movable body 10 and fixed body 20 of vibration actuator 1 may be configured in any way as long as they are configured to generate vibration by causing movable body 10 to reciprocate by cooperation between coil 12 to be energized and second magnet 40. Vibration actuator 1 may dispense with first magnet 30, and may not be configured to cause movable body 10 to oscillate with respect to fixed body 20. Further, vibration actuator 1 may be configured such that coil 12 is provided in fixed body 20 and the one or more magnets (second magnet 40) are provided in movable body 10. In any configuration, one in the movable body and the other in the fixed body, in which the one and the other are the coil and the one or more magnets (second magnet 40) in this order or in the reversed order, are configured such that an attraction magnetic force changes at every position of or in part of a movement trajectory of the one with respect to the other.

Movable body 10 is movably supported with respect to fixed body 20 by a magnetic spring by means of a magnetic attraction force of the one or more magnets (first magnet 30 and second magnet 40). In the present embodiment, movable body 10 is movably supported around shaft part 50 with respect to fixed body 20 by a magnetic spring formed by the one or more magnets (first magnet 30 and second magnet 40), coil 12, and core 14.

In the present embodiment, the magnetic spring is configured to include core 14 around which coil 12 is wound, and first magnet 30 and second magnet 40 as the one or more magnets, but will be described as being formed mainly by coil 12, core 14, and second magnet 40.

Even when coil 12 is energized with currents of different frequencies, movable body 10 is movable in a set frequency band which is wide and in which movable body 10 is capable of suitably oscillating in accordance with each current. A frequency to be input to coil 12 with a driving signal is also referred to as "input frequency". In the present embodiment, as will be described later, a frequency band in which vibration is generated is wide, and a set vibration or a G value stronger than the set vibration is exhibited in the wide frequency band, that is, movable body 10 is capable of strongly vibrating in the wide frequency band. Note that, the G value is the acceleration, and means the strength of a vibration. Details of a frequency response of movable body 10, that is, vibration actuator 1 will be described later.

Movable body 10, without using an elastic support member as a component such as a plate spring and a coil spring, is supported to be capable of vibrating with respect to fixed body 20. Thus, it is possible to decrease the number of components for an elastic support part. Further, no space for disposing an elastic support part needs to be ensured in a housing of vibration actuator 1 so that it is possible to achieve more compact vibration actuator 1 itself.

In addition, when the movable body is continuously vibrated by resonance in a reliability test such as a durability test, most burden is imposed on a mechanical spring as an elastic support member, such as a plate spring and a coil spring, and therefore the mechanical spring first becomes dysfunctional. In vibration actuator 1, on the other hand, resonance is realized only by a magnetic spring and no mechanical spring is used so that there is almost no mechanical loss, and vibration actuator 1 can be used semi-permanently. Vibration actuator 1 of the present embodiment can be said to be applicable to all resonant devices using a magnetic spring, that is, vibration devices utilizing resonance.

[Shaft Part 50]

Figure 5:
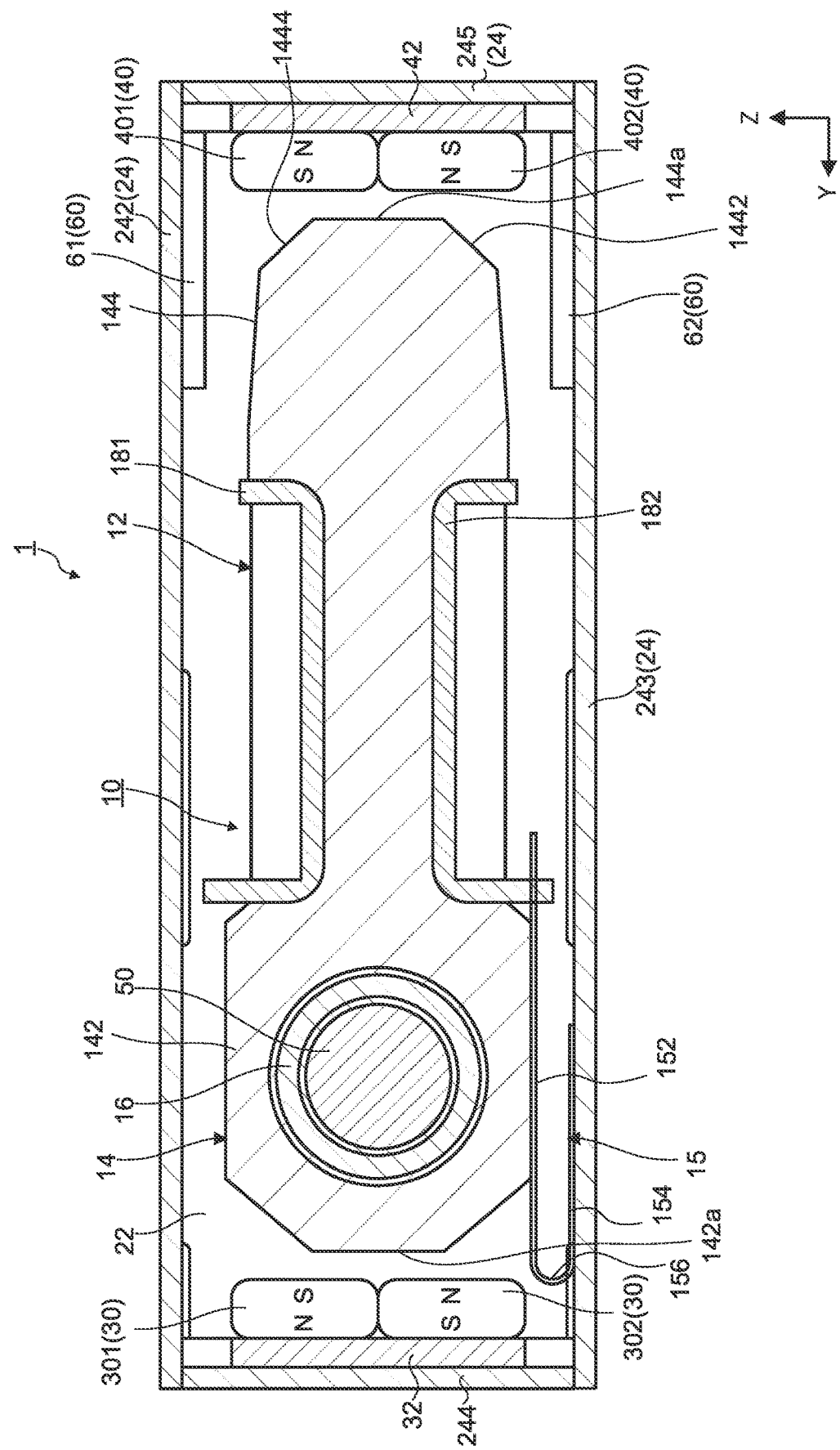
FIG. 5 is a plane sectional view of a configuration of principal parts of the vibration actuator.

FIG. 5 is a plane sectional view of a configuration of principal parts of the vibration actuator.

Shaft part 50 supports movable body 10 to be capable of vibrating by oscillation with respect to fixed body 20. Shaft part 50 may be either a non-magnetic body or a magnetic body. In the present embodiment, shaft part 50 is composed of a magnetic body such as SUS420J2, for example.

Shaft part 50 is disposed between base plate 22 and bottom surface part 241 of case 24 fixed to base plate 22. Washer 282 that is externally applied on shaft part 50 is interposed between bottom surface part 241 of case 24 and movable body 10, and washer 284 that is externally applied on shaft part 50 is interposed between base plate 22 and movable body 10. By washers 282 and 284 described above, shaft part 50 supports movable body 10 to smoothly oscillate with respect to fixed body 20.

[Movable Body 10]

Movable body 10 includes coil 12, core 14 around which coil 12 is wound, bushing (bearing) 16 that is a bearing, and coil bobbin 18 (divided bobbin bodies 181 and 182).

Core 14 is formed by a long magnetic body extending in a direction of a coil axis of coil 12. Core 14 is disposed between base plate 22 and bottom surface part 241 of case 24 with predetermined intervals from each of base plate 22 and bottom surface part 241. Here, the predetermined intervals refer to a space composing the movement range of movable body 10.

Core 14 is preferably a magnetic body that is magnetized by energizing coil 12. Core 14 may be a ferrite core. Further, core 14 may be composed of an electromagnetic stainless steel, a sintered material, an MIM (metal injection molding) material, a laminated steel plate, an electrogalvanized steel plate (SECC: steel electrolytic cold commercial), or the like.

Core 14 is provided to extend in a direction orthogonal to an axial direction of shaft part 50. Core 14 is rotatably provided via shaft part 50 inserted through core 14 on a side of one end thereof, and another end part (tip part) 144 of core 14 vibrates as a free end part in a direction parallel to fixed body 20 (specifically, a surface part of base plate 22 and bottom surface part 241 of case 24), here in the Z direction.

Core 14 includes one end part (base end part) 142 in which a through-hole is formed. Bushing 16 through which shaft part 50 is inserted is fitted into the through-hole.

Coil bobbin 18 (divided bobbin bodies 181 and 182) is externally applied between one end part 142 and another end part 144 of core 14, and coil 12 is wound around coil bobbin 18. In the present embodiment, movable body 10 is formed in a rectangular parallelepiped shape by winding coil 12 around core 14 via coil bobbin 18.

By energizing and exciting coil 12, a center of a length of each of end surface 142a and end surface (included in the tip part) 144a of the both end parts of core 14, that is, one end part 142 and another end part (tip part) 144, in a thickness direction, that is, in the vibration direction (the Z direction) becomes a center of the magnetic poles. End surfaces 142a and 144a are located in an axial direction of the coil.

Further, one end part 142 and another end part 144 of core 14 each include chamfered corner parts away from each other in the vibration direction such that lengths of end surfaces 142a and 144a of one end part 142 and another end part 144 in the vibration direction become shorter.

Thus, it is configured that the thicknesses of one end part 142 and another end part 144 of core 14 in the vibration direction are thinner toward sides of end surfaces 142a and 144a, and that a magnetic flux passing through each of one end part 142 and another end part 144 concentrates on the center of the magnetic poles. In particular, by providing the corner parts of another end part 144, which are away from each other in the vibration direction, with inclined surface 1442 and 1444 (see FIG. 5), end surface 144a of another end part 144 has a smaller area than in the case of a state in which inclined surface 1442 and 1444 (see FIG. 5) are not provided. Thus, a maximum oscillation angle when movable body 10 oscillates from a reference position to be described later is large. By changing the area of end surface 144a of tip part 144, it is possible to change a magnetic spring constant (spring constant) and a frequency band in which vibration is possible.

In the present embodiment, it is possible to change a magnetic spring constant to be described later based on formation angles of inclined surfaces 1442 and 1444.

In movable body 10, the center of the magnetic poles of movable body 10 is disposed on the coil axis of coil 12.

Bushing 16 has a tubular shape. Shaft part 50 is inserted through bushing 16, and bushing 16 causes movable body 10 to be rotatable around shaft part 50. Bushing 16 may be formed by any material such as a metal, such as a sintered metal, and a resin. In the case where shaft part 50 is a magnetic body, however, bushing 16 is preferably formed by a non-magnetic material. Further, when shaft part 50 is a non-magnetic body, bushing 16 may be formed by a magnetic body.

When one of shaft part 50 and bushing 16 is a non-magnetic body, a magnetic flux passing through core 14 does not pass between shaft part 50 and bushing 16, and no increase in friction due to the generation of a magnetic attraction force occurs between both. That is, no friction due to a magnetic attraction force is generated between bushing 16 and shaft part 50 inserted through bushing 16, and it is possible to perform the rotation of movable body 10 smoothly.

For example, vibration actuator 1 is formed by using a magnetic shaft having durability (for example, SUS420J2) as shaft part 50 and a copper-based sintered bearing as bushing 16. This configuration makes it possible to suppress a magnetic attraction force unnecessary for driving of movable body 10 and to hold movable body 10 with low friction.

That is, it is possible to suppress wear due to driving of movable body 10 and to realize vibration actuator 1 with a high reliability.

One end part 152 of flexible substrate 15 is fixed to one end part 142 of core 14. Both end parts of coil 12 are connected to a circuit of flexible substrate 15.

Flexible substrate 15 supplies power to coil 12. In the present embodiment, flexible substrate 15 is disposed so as to connect movable body 10 and fixed body 20.

Flexible substrate 15 includes one end part 152, another end part 154, and at least one curved part 156 between one end part 152 and another end part 154. One end part 152 is connected to coil 12 of movable body 10. Another end part 154 is fixed on aside of fixed body 20. Curved part 156 has flexibility and is electrically connected to coil 12 from a side of one end of flexible substrate 15.

Curved part 156 is interposed between one end part 152 and another end part 154, and has flexibility to be deformed following the vibration of movable body 10. Curved part 156 bends in the direction orthogonal to the axial direction of shaft part 50.

Coil 12 is a coil that is energized to move movable body 10, and is energized to magnetize one end part 142 and another end part 144 of core 14. Coil 12 changes the polarities of the both end parts (one end part 142 and another end part 144) of core 14 by switching the energization direction.

Coil bobbin 18 is composed of divided bobbin bodies 181 and 182. Each of divided bobbin bodies 181 and 182 is fixed by being externally applied so as to circumferentially surround a portion between one end part 142 and another end part 144 of core 14. For example, divided bobbin bodies 181 and 182 may be composed of a resin material such as a polyamide resin, a liquid crystal polymer, and a polyphenylene sulfide resin (PPS resin).

[Fixed Body 20]

Fixed body 20 rotatably supports movable body 10 via shaft part 50.

Fixed body 20 includes, in addition to the one or more magnets (first magnet 30 and second magnet 40), base plate 22 and case 24. Fixed body 20 further includes a cushion material (buffer part 60).

Base plate 22 is formed by a plate-like material such as a steel plate (a rectangular plate in the present embodiment). In the present embodiment, base plate 22 composes one side surface of vibration actuator 1. Note that, base plate 22 is attached such that case 24 covers base plate 22, and base plate 22 and case 24 compose a housing that movably houses movable body 10. In the present embodiment, the housing is formed to be hollow and to have a rectangular parallelepiped shape. On a side of one end of the housing in the longitudinal direction, shaft part 50 is fixed along a direction orthogonal to the vibration direction of movable body 10. Bottom surface part 241 of case 24 composes another side surface facing the one side surface of vibration actuator 1.

On base plate 22, shaft part 50 is erected via shaft fixing part 23 on a side of one end of base plate 22, and movable body 10 is disposed away from and facing base plate 22. Further, in one end part of base plate 22, first magnet 30 is disposed facing a side of one end of movable body 10, and in another end part of base plate 22, second magnet 40 is disposed facing the side of the other end of movable body 10.

Case 24 is fixed to base plate 22 so as to cover movable body 10 facing base plate 22.

Another end of shaft part 50 is fixed to bottom surface part 241 of case 24, which faces base plate 22 in the width direction (the X direction), via the shaft fixing part (not illustrated).

Case 24 is formed in a box shape (a rectangular box shape in the present embodiment) that opens on a side of base plate 22. Case 24 includes bottom surface part 241, both of side surface parts 242 and 243, one end surface part 244, and another end surface part 245. Shaft part 50 is disposed between bottom surface part 241 and base plate 22. Both of side surface parts 242 and 243 are disposed away from and facing each other in the vibration direction (here, the Z direction) of movable body 10. One end surface part 244 and another end surface part 245 are disposed away from and facing each other in an extending direction (here, the Y direction) of movable body 10.

The dimensions of the housing formed by attaching case 24 to base plate 22 are not particularly limited. In the present embodiment, however, the housing is configured so as to have a rectangular parallelepiped shape in which, among the width (the X direction), the depth (the Y direction), and the height (the Z direction), the depth is the longest and the height is the shortest.

Case 24 and base plate 22 may be formed by a material having conductivity, for example, a plate-like material such as a steel plate (a rectangular plate in the present embodiment). Thus, base plate 22 and case 24 are capable of functioning as electromagnetic shields.

Further, on a side of another end of case 24, buffer part 60 (cushion materials 61 and 62) with which a side of a free end of movable body 10 that vibrates comes into contact is provided in both of side surface parts 242 and 243 of case 24, respectively.

Figure 7A:
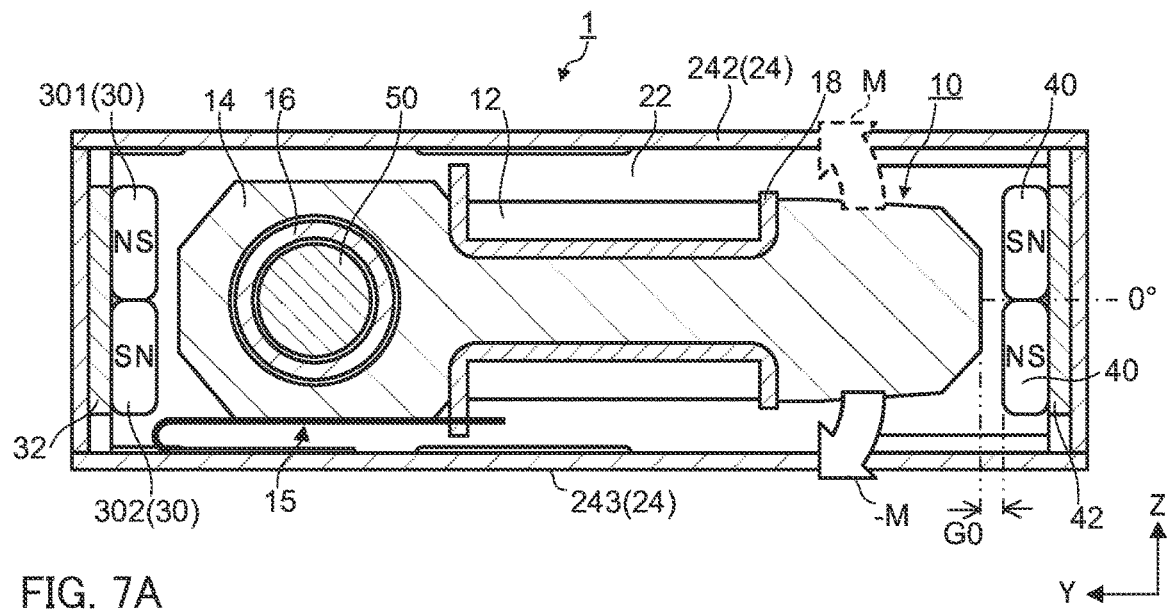
FIGS. 7A, 7B and 7C are plane sectional views illustrating operation of the movable body.
Figure 7B:
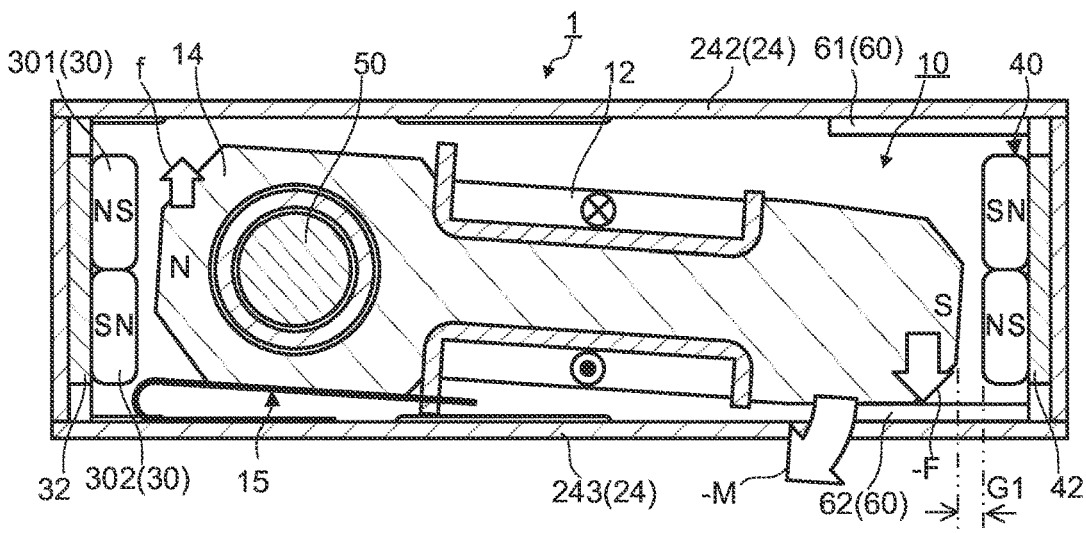
Figure 7C:
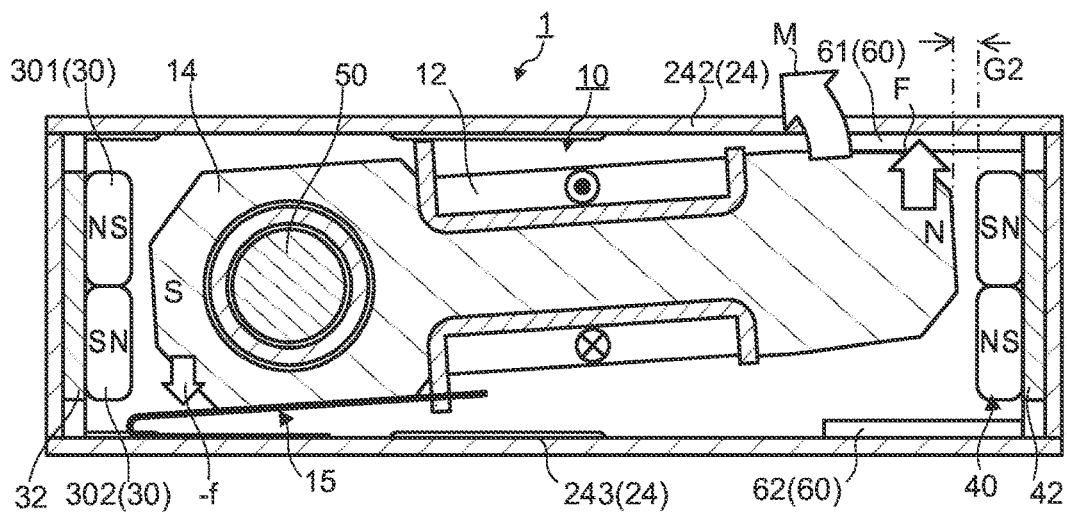

When movable body 10 vibrates, another end part of movable body 10 comes into contact with buffer part 60, and thereby buffer part 60 transmits the vibration of movable body 10 to the housing of vibration actuator 1 (see FIGS. 7A to 7C). Thus, buffer part 60 makes it possible to generate a large vibration in the housing.

Buffer part 60 is formed by, for example, a soft material such as a rubber, such as an elastomer and a silicone rubber, a resin, or a porous elastic body (for example, a sponge). In the present embodiment, buffer part 60 is configured as cushion materials 61 and 62 provided in both of side surface parts 242 and 243 each of which is a side of the housing. Buffer part 60 may be provided on a side of movable body 10, for example, in another end part 144 that is a free end part of movable body 10, so that movable body 10 comes into contact with both of side surface parts 242 and 243 at buffer part 60 when movable body 10 vibrates. In a case where buffer part 60 is an elastomer, it is possible to reduce generation of a sound or a vibration noise created when another end part 144 of core 14 of movable body 10 comes into contact with side surface parts 242 and 243 during driving of movable body 10.

Further, in a case where buffer part 60 is a silicone rubber, generation of a sound or a vibration noise created when another end part 144 of core 14 of movable body 10 comes into contact with side surface parts 242 and 243 can be reduced. In addition, in a case where buffer part 60 is a silicone rubber, no individual difference occurs in the thickness of buffer part 60 in comparison with a case where buffer part 60 is an elastomer formed by a sponge-like material containing bubbles inside. Accordingly, it is possible to easily manage the thickness of buffer part 60 such that buffer part 60 has a desired thickness, and to ensure stability of characteristics as buffer part 60.

The one or more magnets (first magnet 30 and second magnet 40) move movable body 10 by cooperation with coil 12. The one or more magnets function as a magnetic spring by means of a magnetic attraction force with respect to movable body 10. In the present embodiment, the one or more magnets and core 14 around which coil 12 is wound form the magnetic spring to movably support movable body 10.

The one or more magnets are arranged to face each other in an axial direction of coil 12 with respect to coil 12.

In the present embodiment, the one or more magnets include first magnet 30 away from and facing one end part of core 14 in the axial direction of coil 12, and second magnet 40 away from and facing another end part of core 14 in the axial direction of coil 12.

Each of first magnet 30 and second magnet 40 is magnetized toward core 14 (movable body 10). In the present embodiment, the magnetization directions of first magnet 30 and second magnet 40 are parallel to the axial direction of coil 12. Each of first magnet 30 and second magnet 40 includes, each as a surface on a side facing core 14, two different magnetic poles arranged in a direction (corresponding to the vibration direction of movable body 10) orthogonal to an extending direction of shaft part 50.

The magnetic poles are disposed such that a center of core 14 of movable body 10 (here, the center is on an axis of coil 12 and corresponds to a center of the magnetic poles when coil 12 is excited) is located so as to be on the same axis as a boundary between the magnetic poles, that is, a switching position of the magnetic poles, while the center faces the switching position. Note that, the switching position of the magnetic poles and the center of core 14 of movable body 10 may not be disposed on the same axis so as to face each other squarely, and may be at positions that are somewhat shifted from each other. The position of the center of core 14 of movable body 10 described above may serve as a reference position when movable body 10 moves using the magnetic spring formed by core 14 around which coil 12 is wound and the one or more magnets. In the present embodiment, a position at which the tip part (end surface 144a) of core 14 faces the switching position of the two magnetic poles is set as the reference position, and a state of movable body 10 in which the tip part (end surface 144a) of core 14 is located at the reference position is referred to as "reference state". The one or more magnets (in particular, second magnet 40) function as a magnetic spring by attracting core 14, and energize the tip part of core 14 to be always located at the reference position.

The polarities of the magnetic poles of both of first magnet 30 and second magnet 40 are magnetized such that torque to be generated by exciting coil 12 of movable body 10 is generated in the same rotational direction as that of movable body 10.

For example, as illustrated in FIG. 5, magnetic poles 301 and 401 of first magnet 30 and second magnet 40, each of which is disposed on a side of side surface part 242 and faces movable body 10, are each formed so as to be the same pole (the S pole in FIG. 5). Further, magnetic poles 302 and 402 of first magnet 30 and second magnet 40, each of which is disposed on a side of side surface part 243 and faces movable body 10, are each formed so as to be the same pole (the N pole in FIG. 5).

First magnet 30 includes a rear surface on which back yoke 32 is bonded, and second magnet 40 includes a rear surface on which back yoke 42 is bonded, so that an improvement in an magnetic attraction force of each of first magnet 30 and second magnet 40 is achieved.

In a case where magnetization is performed in first magnet 30 and second magnet 40 such that the S pole is on the side of side surface part 242 and the N pole is on the side of side surface part 243, a magnetic flux emitted from the N pole and incident on the S pole is formed at first magnet 30 and second magnet 40, respectively, when coil 12 is not energized as illustrated in FIG. 5. When energization is not performed, one end part 142 of core 14 around which coil 12 is wound is attracted to both the S and N poles of first magnet 30, and is held at a switching position of magnetic poles 301 and 302 that are different from each other (the S and N poles), and further another end part 144 of core 14 is attracted to both the S and N poles of second magnet 40, and is held at a switching position of magnetic poles 401 and 402 that are different from each other (the S and N poles). First magnet 30 and second magnet 40, together with core 14 that is a magnetic body of movable body 10, function as a magnetic spring by means of a magnetic attraction force generated between first magnet 30 or second magnet 40 and core 14 to movably support movable body 10.

Another end part 154 of flexible substrate 15 that is connected to coil 12 with one end part 152 is fixed to side surface part 243.

One end part 152 of flexible substrate 15, which is connected to coil 12, is fixed to one end part of movable body 10. Another end part 154 of flexible substrate 15 is fixed to fixed body 20, here, to side surface part 243. Another end part 154 is, while being partially exposed to an outer surface of the housing, fixed to side surface part 243. When movable body 10 moves, the movement range near shaft part 50 is smaller than in a portion on the side of the other end of movable body 10. For this reason, a load applied to curved part 156 of flexible substrate 15 disposed near shaft part 50 is reduced. Thus, since flexible substrate 15 is fixed near shaft part 50, it is possible to minimize displacement of flexible substrate 15 and to prevent disconnection due to a stress generated during movement.

Note that, it may be configured such that, for example, an elastic member such as an elastic adhesive or an elastic adhesive tape is interposed between one end part 152 of flexible substrate 15 and movable body 10 and absorbs an impact created during vibration.

[Magnetic Circuit of Vibration Actuator 1]

Figure 6:
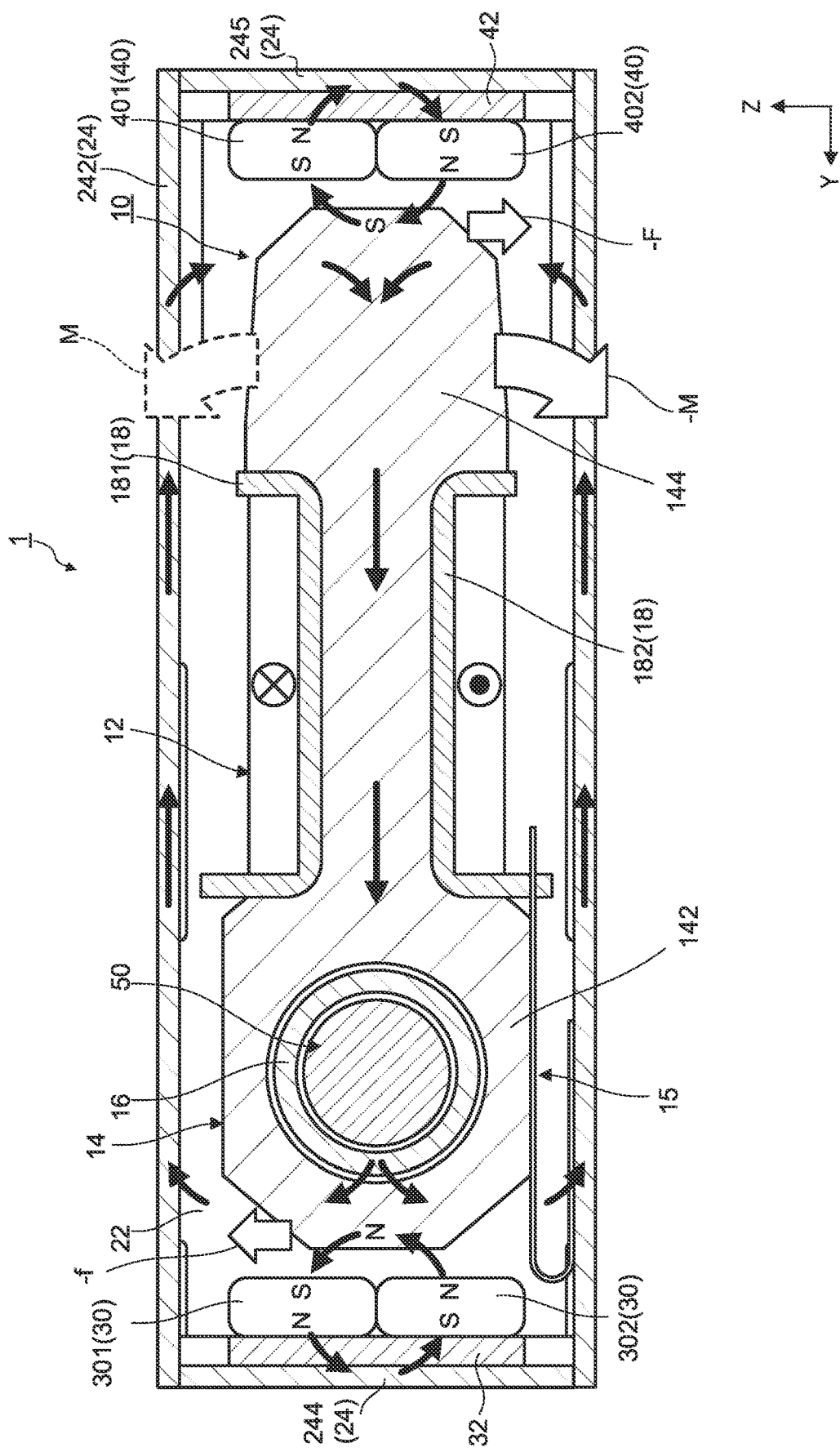
FIG. 6 illustrates a magnetic circuit of the vibration actuator.

FIG. 6 illustrates a magnetic circuit of the vibration actuator. FIGS. 7A to 7C are longitudinal sectional views illustrating operation of the movable body. FIG. 7A illustrates a state of movable body 10 when energization is not performed (reference state). FIG. 7B illustrates a state of movable body 10 when coil 12 is energized clockwise when viewing vibration actuator 1 from a side of a tip part of movable body 10, that is, a side of another end part 144 of core 14. Further, FIG. 7C illustrates a state of movable body 10 when coil 12 is energized counterclockwise when viewing vibration actuator 1 from the side of the tip part of movable body 10, that is, the side of another end part 144 of core 14.

In vibration actuator 1, movable body 10 is disposed in a state where the side of the one end of movable body 10 is supported via shaft part 50 between base plate 22 of fixed body 20 and case 24. In addition, the one or more magnets (first magnet 30 and second magnet 40) are disposed to face the both end parts (one end part 142 and another end part 144) of core 14 around which coil 12 is wound, with the two different magnetic poles of each of the one or more magnets being directed toward a side of coil 12, in the axial direction of coil 12 of movable body 10. Magnetic pole 301 of first magnet 30 and magnetic pole 401 of second magnet 40 are the same pole, and magnetic pole 302 of first magnet 30 and magnetic pole 402 of second magnet 40 are the same pole.

In each magnet of first magnet 30 and second magnet 40, magnetic poles 301 and 302 that are two different magnetic poles are arranged side by side in the direction orthogonal to the axial direction of shaft part 50, and magnetic poles 401 and 402 that are two different magnetic poles are arranged side by side in the direction orthogonal to the axial direction of shaft part 50.

Figure 21:
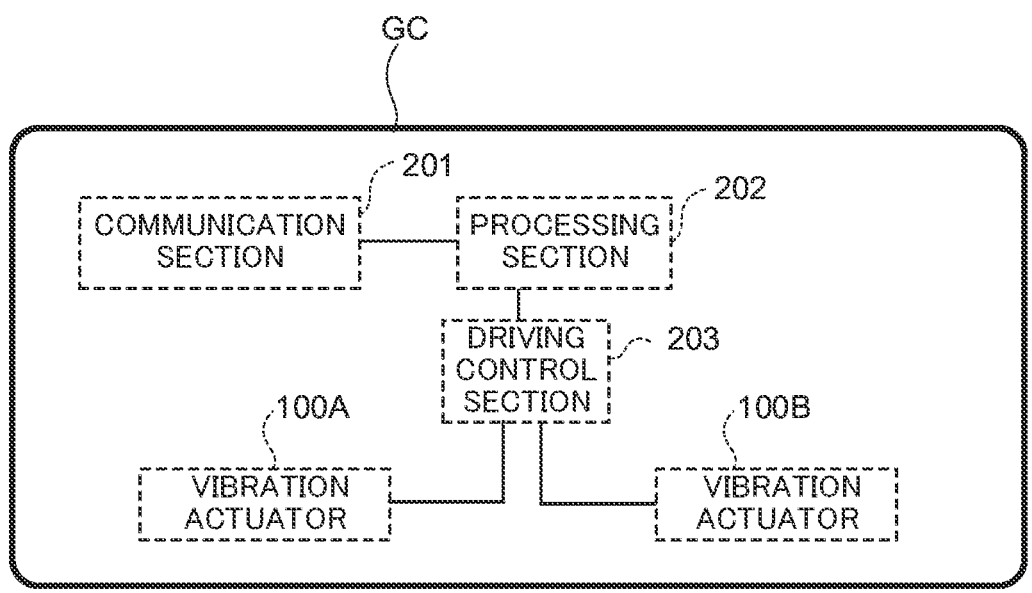
FIG. 21 illustrates a game apparatus which is an example of an electronic apparatus on which the vibration actuator is mounted.
Figure 22:
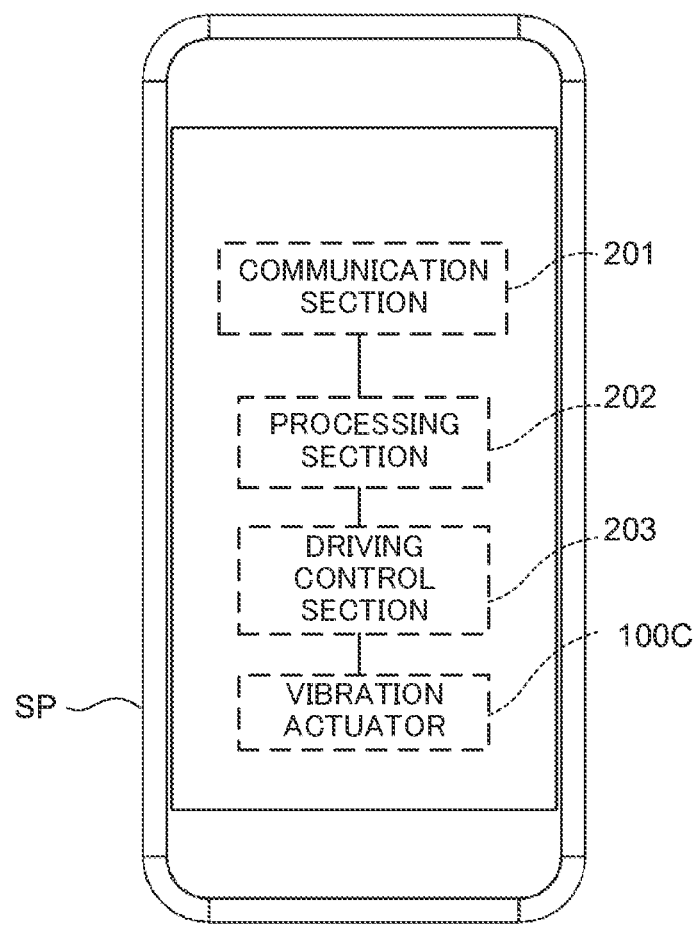
FIG. 22 illustrates a portable information terminal which is an example of the electronic apparatus on which the vibration actuator is mounted.
Figure 23:
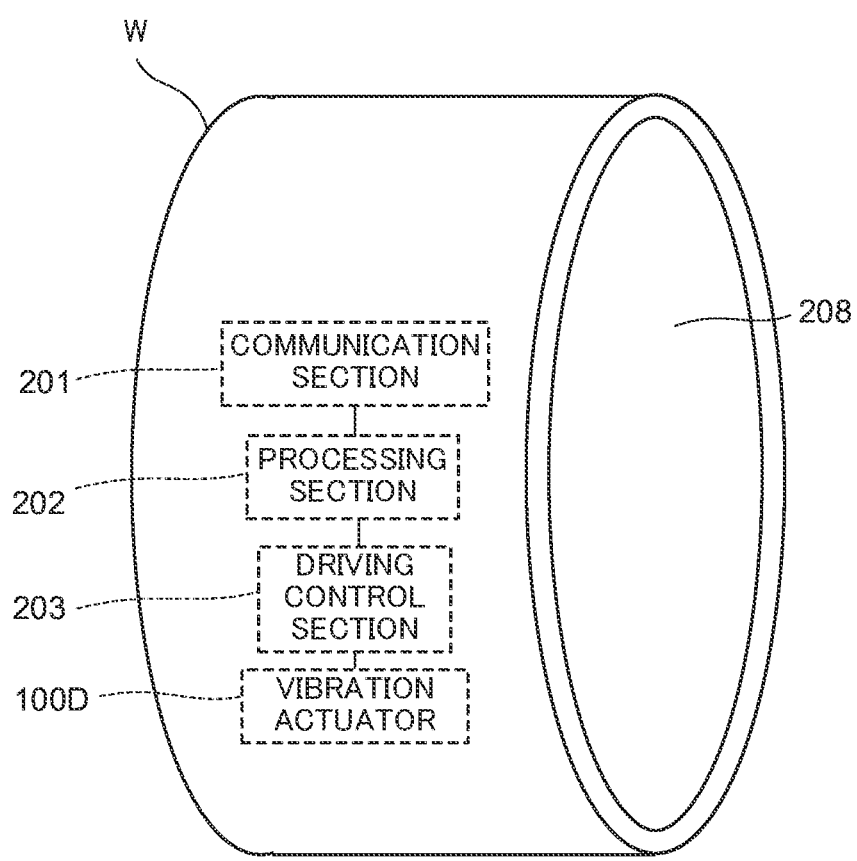
FIG. 23 illustrates a wearable terminal which is an example of the electronic apparatus on which the vibration actuator is mounted.

Movable body 10 reciprocates in the Z direction, that is, in a direction in which movable body 10 comes into contact with or is separated from side surface part 242 or 243 of case 24, by energization of coil 12 via flexible substrate 15 from a power supply section (for example, driving control section 203 illustrated in FIGS. 21 to 23). Specifically, the other end part of movable body 10 oscillates. In this way, a vibrational output of vibration actuator 1 is transmitted to a user of an electronic apparatus including vibration actuator 1.

The magnetic circuit illustrated in FIG. 6 is formed in vibration actuator 1.

In vibration actuator 1, when coil 12 is not energized (reference state), the both end parts (one end part 142 and another end part 144) of core 14 around which coil 12 is wound via coil bobbin 18 are attracted to first magnet 30 and second magnet 40, respectively.

A center of a length (length in the vibration direction) orthogonal to each axial direction of the both end parts (one end part 142 and another end part 144) of core 14 is located at a position facing the switching position of the magnetic poles of the one or more magnets. Note that, the center of the length (length in the vibration direction) orthogonal to each axial direction of the both end parts (one end part 142 and another end part 144) is located on the same axis as the axis of coil 12.

Specifically, one end part 142 of core 14 is attracted by magnetic attraction forces of both of magnetic poles 301 and 302, which are different from each other, of first magnet 30, and is held at the switching position of magnetic poles 301 and 302.

Further, another end part (free end part) 144 of core 14 is attracted by magnetic attraction forces of both of magnetic poles 401 and 402, which are different from each other, of second magnet 40, and is held at the switching position of magnetic poles 401 and 402.

Thus, movable body 10 is held in the reference state only by the magnetic spring formed by first magnet 30 and second magnet 40 of fixed body 20.

In vibration actuator 1, coil 12 is disposed so as to be along and away from magnetic fluxes from first magnet 30 and second magnet 40.

With this configuration, when energization is performed as illustrated in FIGS. 6 and 7B, the both end parts (one end part 142 and another end part 144) of core 14 are magnetized so as to be magnetic poles different from each other by a current flowing through coil 12. Specifically, one end part 142 is magnetized to the N pole, and another end part 144 is magnetized to the S pole.

Thus, one end part 142 is attracted to magnetic pole 301 of first magnet 30 and repels magnetic pole 302 of first magnet 30 to generate thrust f, and moves in a direction of thrust f. On the other hand, another end part 144 repels magnetic pole 401 of second magnet 40, is attracted to magnetic pole 402 of second magnet 40, and moves in a direction of thrust −F.

As illustrated in FIG. 7B, in vibration actuator 1, the both end parts (one end part 142 and another end part 144) located with shaft part 50 therebetween move in the directions of thrust f and thrust −F, respectively, by energizing coil 12, thereby generating thrust −M that is the same rotational direction. Thus, movable body 10 rotates around shaft part 50 in a direction of thrust −M, and another end part 144 of movable body 10 moves onto the side of side surface part 243, comes into contact (specifically, collides) with side surface part 243, that is, the housing via cushion material 62, and imparts vibration to the housing.

Further, when the energization direction of coil 12 is switched to the opposite direction and energization is performed as illustrated in FIG. 7C, thrust −f and thrust F whose directions are opposite to each other are generated. Specifically, one end part 142 is magnetized to the S pole, and another end part 144 is magnetized to the N pole. Thus, one end part 142 repels magnetic pole 301 of first magnet 30 and is attracted to magnetic pole 302 of first magnet 30 to generate thrust −f, and moves in a direction of thrust −f. On the other hand, another end part 144 is attracted to magnetic pole 401 of second magnet 40, repels magnetic pole 402 of second magnet 40, and moves in a direction of F.

As illustrated in FIG. 7C, in vibration actuator 1, the both end parts (one end part 142 and another end part 144) located with shaft part 50 therebetween move in the directions of thrust −f and thrust F, respectively, by energizing coil 12, thereby generating thrust M that is the same rotational direction. Thus, movable body 10 rotates around shaft part 50 in a direction of thrust M, and another end part 144 of movable body 10 moves onto the side of side surface part 242 opposite to side surface part 243, comes into contact (specifically, collides) with side surface part 242, that is, the housing via cushion material 61, and imparts vibration to the housing.

In vibration actuator 1, movable body 10 is supported to be capable of vibrating (oscillating) around shaft part 50 with respect to fixed body 20 only by means of the magnetic spring using the one or more magnets (first magnet 30 and second magnet 40), coil 12, and core 14, without using an elastic member such as a plate spring.

Accordingly, unlike a vibration actuator configured to support a movable body to be capable of vibrating by a metal spring as in the related art, it is possible to prevent damage due to metal fatigue or impact, which represents a problem specific to metal springs.

Further, shaft part 50 rotatably supports movable body 10 at a position shifted from a center position of movable body 10. Thus, unlike a vibration actuator in the related art which is configured to generate vibration by rotationally driving a movable body having a cylindrical shape around a rotary shaft, it is not necessary to design such that a position of center of gravity is shifted separately, such as adding a weight, and it is possible to achieve a reduction in components and costs for that purpose.

Since no separate component for shifting a position of center of gravity is required, it is possible to realize a vibration actuator which has a high degree of freedom of layout in design without increasing the design size, is small, and gives sufficient physically-felt vibration to a user.

In vibration actuator 1 of the present embodiment, the housing composed of base plate 22 and case 24 has a rectangular parallelepiped shape, and movable body 10 oscillates and vibrates in a short-side direction (the Z direction). Thus, even in a case where the vibration actuator is applied to a switch having a rectangular shape, it is possible to cause vibration without unevenness throughout the switch.

Further, in the present embodiment, the one or more magnets are disposed as first magnet 30 and second magnet 40 on both sides of core 14, and magnetic poles 301 and 302 that are two magnetic poles, and magnetic poles 401 and 402 that are two magnetic poles are disposed, respectively, such that torque to be generated in each of end parts 142 and 144 is generated in the same rotational direction. In the both end parts (one end part 142 and another end part 144) of core 14, magnetic attraction forces are generated between core 14 and first magnet 30 and second magnet 40. Thus, when movable body 10 is moved by cooperation between first magnet 30 and second magnet 40 and coil 12, a load applied to shaft part 50 due to magnetic attraction forces is offset. Accordingly, it is possible to reduce a load applied to shaft part 50 and bushing 16, and to improve reliability as a vibration actuator.

Further, in the housing, movable body 10 comes into contact with side surface parts 242 and 243 of the housing. Thus, vibration can be directly transmitted to vibration actuator 1 itself, and a large vibration can be generated. In addition, since movable body 10 comes into contact with fixed body 20 (housing) when movable body 10 vibrates, the amount of vibration also becomes constant, and a stable vibrational output can be realized as vibration actuator 1.

Note that, another end part 144 of core 14, which is the free end part of movable body 10, is formed such that the thickness in the Z direction becomes thinner toward the side of the free end. Thus, portions with which another end part 144 comes into contact via cushion materials 61 and 62 have a wider movement range during oscillation in comparison with a case where the thicknesses in the Z direction are the same thickness toward the side of the free end, and a larger vibrational output can be ensured.

Further, according to vibration actuator 1, buffer part 60 is provided in at least one of movable body 10 and inner wall surfaces (side surface parts 242 and 243) of case 24 (in side surface parts 242 and 243 in the present embodiment). Movable body 10 and the inner wall surfaces (here, side surface parts 242 and 243) of case 24 come into contact with each other via buffer part 60 (cushion materials 61 and 62). Buffer part 60 is capable of alleviating an impact when movable body 10 vibrates to come into contact with base plate 22 or case 24, and is capable of, while reducing generation of a contact sound or a vibration noise, transmitting vibration to a user. Further, since movable body 10 alternately comes into contact (specifically, collides) with base plate 22 and case 24 via buffer part 60 every time movable body 10 vibrates, the vibrational output is amplified. Thus, a user can physically feel a vibrational output greater than an actual vibrational output by movable body 10. Further, since base plate 22 is a member to be attached to a user, the vibration of movable body 10 is directly transmitted to the user via base plate 22 so that the user can physically feel a much greater vibrational output.

Here, vibration actuator 1 is driven by an AC wave that is input from the power supply section (for example, driving control section 203 illustrated in FIGS. 21 to 23) to coil 12 via flexible substrate 15. That is, the energization direction of coil 12 is switched periodically, and thrust M on the plus side in the Z direction and thrust −M on the minus side in the Z direction alternately act on movable body 10. Thus, the side of the other end of movable body 10 vibrates in a circular arc shape within the YZ plane.

Hereinafter, a brief description will be given of the driving principle of vibration actuator 1. In vibration actuator 1 of the present embodiment, movable body 10 vibrates with respect to fixed body 20 at resonance frequency $f_r$ [Hz] calculated by following equation 1 where J [kg·m²] represents the moment of inertia of movable body 10 and $K_{sp}$ represents the spring constant (magnetic spring constant) of the magnetic spring.

$$f_r = \frac{1}{2\pi}\sqrt{\frac{K_{sp}}{J}} \quad \text{(Equation 1)}$$

$f_r$: Resonance frequency [Hz]
J: Moment of inertia [kg·m²]
$K_{sp}$: Spring constant [N·m/rad]

Since movable body 10 is amass part in a vibration model of a spring-mass system, movable body 10 is brought into a resonance state when an AC wave of a frequency equal to resonance frequency $f_r$ of movable body 10 is input to coil 12. That is, movable body 10 can be efficiently vibrated by inputting an AC wave of a frequency, which is substantially equal to resonance frequency $f_r$ of movable body 10, from the power supply section (for example, driving control section 203 illustrated in FIGS. 21 to 23) to coil 12.

The equation of movement and the circuit equation representing the driving principle of vibration actuator 1 are indicated below. Vibration actuator 1 is driven based on the equation of movement represented by following equation 2 and on the circuit equation represented by following equation 3.

$$J\frac{d^2\theta(t)}{dt^2} = K_t i(t) - K_{sp}\theta(t) - D\frac{d\theta(f)}{dt} \quad \text{(Equation 2)}$$

J: Moment of inertia [kg·m²]
θ(t): Angle [rad]
$K_t$: Torque constant [N·m/A]
i(t): Current [A]
$K_{sp}$: Spring constant [N·m/rad]
D: Damping coefficient [N·m/(rad/s)]

$$e(t) = Ri(t) + L\frac{di(t)}{dt} + K_e\frac{d\theta(t)}{dt} \quad \text{(Equation 3)}$$

e(t): Voltage [V]
R: Resistance [Ω]
L: Inductance [H]
$K_e$: Counter electromotive force constant [V/(rad/s)]

That is, moment of inertia J [kg·m²], angle of rotation θ(t) [rad], torque constant $K_t$ [N·m/A], current i(t) [A], spring constant $K_{sp}$ [N·m/rad], damping coefficient D [N·m/(rad/s)], and the like of movable body 10 in vibration actuator 1 can be changed appropriately as long as equation 2 is satisfied. Further, voltage e(t) [V], resistance R [Ω], inductance L [H], and counter electromotive force constant $K_e$ [V/(rad/s)] can be changed appropriately as long as equation 3 is satisfied.

As described above, in vibration actuator 1, a great vibrational output can be efficiently obtained in a case where coil 12 is energized using an AC wave corresponding to resonance frequency $f_r$ determined by moment of inertia J of movable body 10 and spring constant $K_{sp}$ of the magnetic spring.

<Variation 1>

Figure 8:
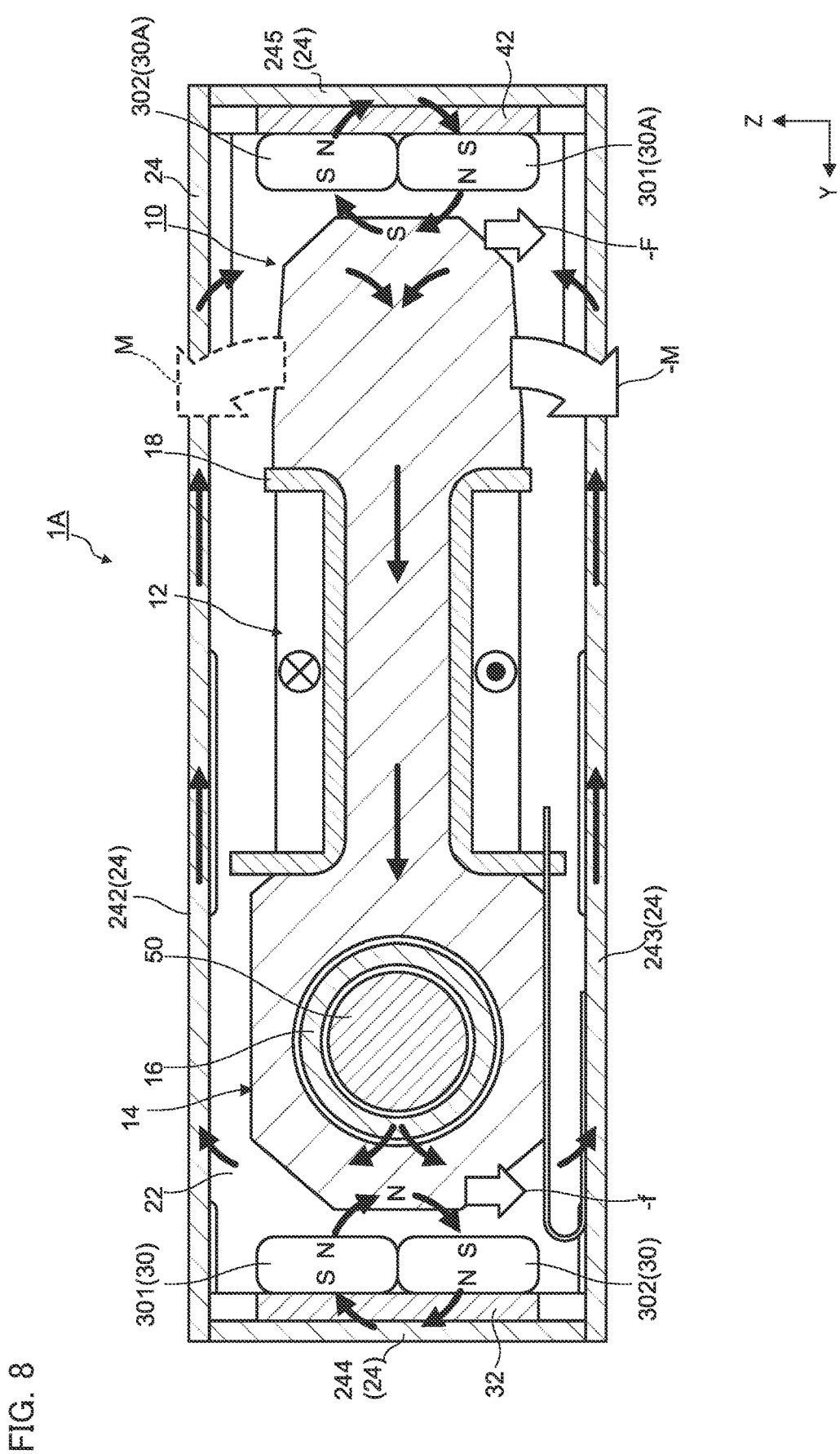
FIG. 8 is a sectional view of a configuration of principal parts of a vibration actuator according to Variation 1 of Embodiment 1.

FIG. 8 is a plane sectional view of a configuration of a magnetic circuit of vibration actuator 1A as a variation of vibration actuator 1 of Embodiment 1. Note that, for convenience, FIG. 8 illustrates a state of movable body 10 when coil 12 is energized clockwise when viewing vibration actuator 1A from a side of a tip part of movable body 10, that is, a side of another end part 144 of core 14.

In comparison with vibration actuator 1, vibration actuator 1A illustrated in FIG. 8 includes, instead of second magnet 40, first magnet 30A that is configured in the same manner as first magnet 30.

That is, in vibration actuator 1A, the one or more magnets disposed to face each other in the axial direction of coil 12 in each of the both end parts (one end part 142 and another end part 144) of core 14 in the configuration of vibration actuator 1 are first magnets 30 and 30A.

In vibration actuator 1A, the one or more magnets are disposed as first magnets 30 and 30A on both sides of core 14, and torque to be generated in each of end parts 142 and 144 is not generated in the same rotational direction. However, in core 14, shaft part 50 is inserted through bushing 16, which is a non-magnetic body, on a side of one end part 142 so that the magnetic poles at one end part 142 are not significantly excited since a magnetic flux generated by energizing coil 12 does not pass through shaft part 50. A side of one end part 142 functions as a magnetic spring without greatly contributing to torque generation by one end part 142 and first magnet 30.

Accordingly, torque generated by one end part 142 and first magnet 30 when causing movable body 10 to vibrate by oscillation by energizing coil 12 does not inhibit torque generated by another end part 144 and first magnet 30A. Thus, in the same manner as vibration actuator 1, unlike a vibration actuator configured to support a movable body to be capable of vibrating by a metal spring as in the related art, vibration actuator 1A makes it possible to prevent damage due to metal fatigue or impact, which represents a problem specific to metal springs.

<Resonance Frequency of Vibration Actuator 1>

In vibration actuator 1 of the present embodiment, movable body 10 is movably configured with respect to fixed body 20 by the magnetic spring formed by coil 12, core 14 and the one or more magnets (in particular, second magnet 40 between first magnet 30 and second magnets 40).

Further, in the present embodiment, it is configured such that a center of oscillation of movable body 10 (core 14) and a portion near the switching position of the magnetic poles of the one or more magnets (in particular, second magnet 40) have a magnetic force attracting each other, which becomes weaker as oscillation becomes larger. That is, in vibration actuator 1, an arrangement structure of core 14 around which coil 12 is wound, that is, an electromagnet, and the one or more magnets (that are permanent magnets, and in particular second magnet 40) is configured such that the maximum magnetic force is generated when movable body 10 (core 14) is at the center of oscillation.

Thus, the attraction magnetic force of second magnet 40 is configured to change with respect to some or all of positions on a track of oscillation of movable body 10 (core 14) with respect to second magnet 40.

Note that, the arrangement structure of core 14 around which coil 12 is wound and second magnet 40 described above may also be an arrangement structure such that the magnetic force at a maximum oscillation width of core 14 is stronger than that at the center of oscillation of core 14. That is, core 14 and the one or more magnets (second magnet 40) may be disposed such that spring constant $K_{sp}$ of the magnetic spring is smallest when the tip part of core 14 is located at the reference position (switching position) with respect to the one or more magnets (second magnet 40), and becomes larger as the tip part of core 14 becomes away from the reference position by oscillation. In the case of this configuration, for example, the magnetic poles of second magnet 40 is closest to core 14 when the switching position of the magnetic poles of second magnet 40 is located at the maximum oscillation width of core 14, which is farthest from core 14 located at the center of oscillation. Specifically, this is realized by such arrangement that second magnet 40 is configured to have an inverted V-shape such that the switching position of the magnetic poles of second magnet 40 is farthest from core 14 located at the center of oscillation, and thereby second magnet 40 is disposed to face core 14 that oscillates.

In vibration actuator 1 of the present embodiment, core 14 draws an arc-shaped trajectory by oscillation from the reference state to be inclined with respect to a magnetic pole surface of second magnet 40 disposed in the Z direction and having a flat plate shape, thereby changing a gap between core 14 and the magnetic pole surface of second magnet 40 (gaps G1 and G2 illustrated in FIGS. 7B and 7C). Thus, in the vibration actuator, movable body 10 including core 14 oscillates while spring constant $K_{sp}$ and further resonance frequency $f_r$ [Hz] change.

Figure 9:
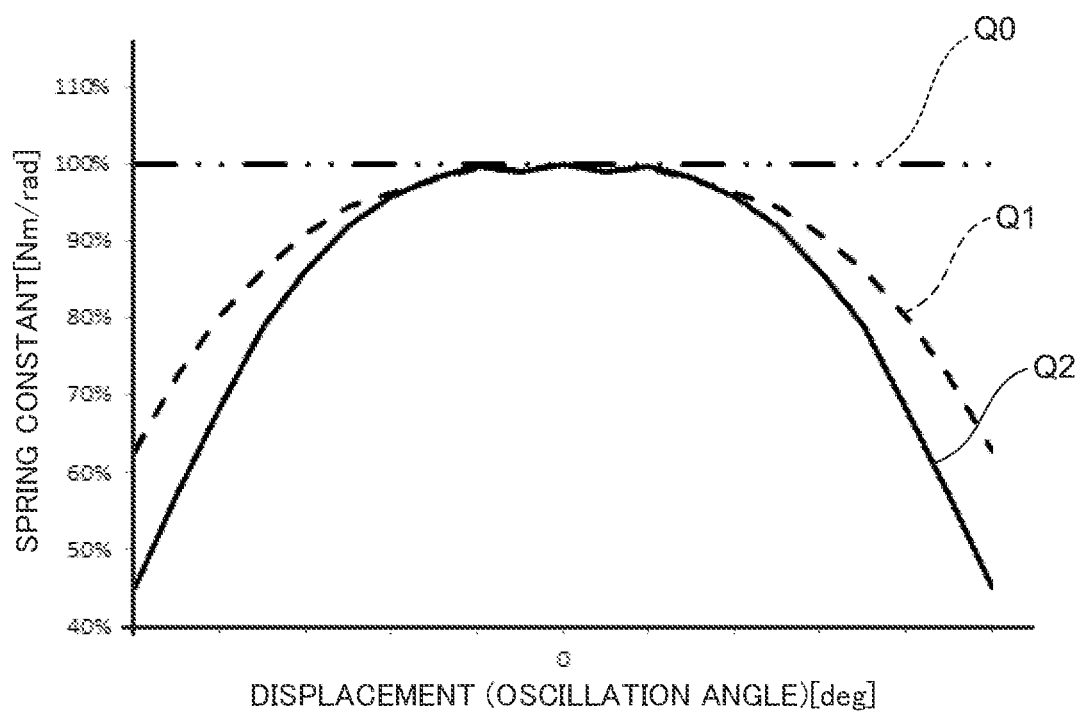
FIG. 9 illustrates a spring constant of the vibration actuator according to Embodiment 1 of the present invention.

FIG. 9 illustrates spring constant $K_{sp}$ of the magnetic spring of vibration actuator 1 of the present embodiment. Note that, vibration actuator 1A also includes a magnetic spring and has a frequency response (resonance frequency) similar to those of vibration actuator 1.

When movable body 10 is in the reference state, a center of the tip part (end surface 144a) of core 14 and the switching position of the magnetic poles of second magnet 40 are located on substantially the same plane (including the same plane) along the Y direction. At this time, the oscillation angle of movable body 10 with respect to second magnet 40 is set to 0° (see FIG. 7A).

In vibration actuator 1, as indicated by graphs Q1 and Q2 in FIG. 9, spring constant $K_{sp}$ is set to be smaller as movable body 10 starts to oscillate from a position of an oscillation angle of 0° and becomes away from the position of the oscillation angle of 0°. Note that, graph Q0 indicates a spring constant in a linear structure with one resonance frequency, and is illustrated as an object to be compared with graphs Q1 and Q2. That is, in vibration actuator 1, core 14 and the one or more magnets (second magnet 40) are disposed such that spring constant $K_{sp}$ of the magnetic spring is largest when the tip part of core 14 is located at the reference position (switching position) with respect to the one or more magnets (second magnet 40), and becomes smaller as the tip part of core 14 becomes away from the reference position by oscillation.

Specifically, core 14 and the one or more magnets (second magnet 40) are disposed such that the gap (G1 or G2) between the center of end surface (tip part) 144a of core 14 around which coil 12 is wound and the one or more magnets (second magnet 40) is smallest at the time of the oscillation angle of 0° (G0), and is largest (G1=G2>G0) when the center of end surface (tip part) 144a of core 14 is located at a position of the maximum oscillation angle.

For example, in a case where spring constant $K_{sp}$ at the time of the oscillation angle of 0° is set to 100%, spring constant $K_{sp}$ at the time of the maximum oscillation angle is preferably set to a value not greater than 90%. That is, in a case where spring constant $K_{sp}$ when tip part 144a of core 14 is located at the reference position is set to 1, spring constant $K_{sp}$ at the time of the maximum oscillation angle is preferably less than or equal to 0.9. Further, in a case where spring constant $K_{sp}$ at the time of the oscillation angle of 0° is set to 100%, that is, in a case where spring constant $K_{sp}$ when tip part 144a of core 14 is located at the reference position is set to 1, spring constant $K_{sp}$ at the time of the maximum oscillation angle is preferably between 0.9 and 0.95. In a case where spring constant $K_{sp}$ at the time of the oscillation angle of 0° is set to 100%, spring constant $K_{sp}$ at the time of the maximum oscillation angle is more preferably a value not greater than 70% (see graph Q1), much more preferably a value not greater than 50%, and further preferably a value not greater than 50% and greater than or equal to 40% (see graph Q2). In particular, in a case where spring constant $K_{sp}$ at the time of the oscillation angle of 0° is set to 100%, spring constant $K_{sp}$ at the time of the maximum oscillation angle, that is, the spring constant when tip part 144a of core 14 oscillates from the reference position and is located at the position of the maximum oscillation angle is preferably greater than or equal to 0.3 and not greater than 0.6 in a case where spring constant $K_{sp}$ when tip part 144a of core 14 is located at the reference position is set to 1. Thus, it is possible to move movable body 10 smoothly by changing spring constant $K_{sp}$ more effectively.

In vibration actuator 1, a difference between spring constant $K_{sp}$ when movable body 10 is at the oscillation angle of 0° and spring constant $K_{sp}$ when movable body 10 oscillates to the maximum is preferably larger.

Vibration actuator 1 of the present embodiment is configured to have spring constant $K_{sp}$ indicated by graph Q2.

Figure 10:
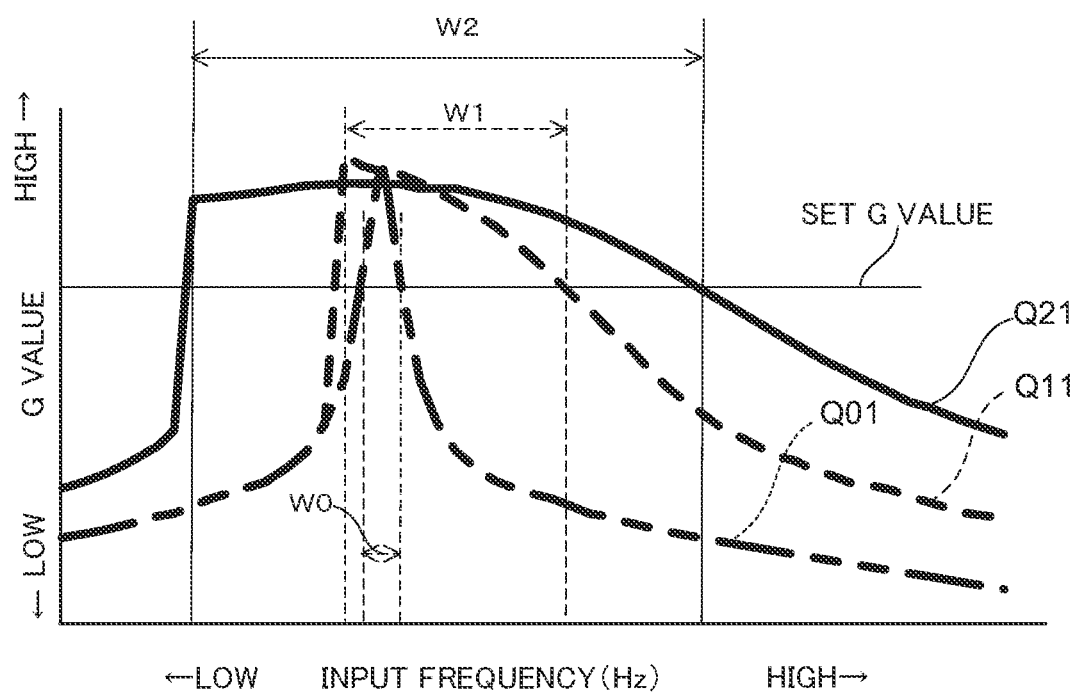
FIG. 10 is a diagram provided for describing a frequency response of the vibration actuator according to Embodiment 1 of the present invention.

FIG. 10 is a diagram illustrating a frequency response of vibration actuator 1 of the embodiment of the present invention. Note that, in the G value illustrated in FIGS. 10 and 11 to 13, the maximum value thereof is generally a value output at the time of resonance (at the time of the maximum amplitude). When the G value is large, it is possible to impart a strong vibration as a sense of touch, and when the G value is small, it is possible to impart a weak vibration as a sense of touch.

As illustrated in FIG. 10, in vibration actuator 1, movable body 10 is provided to be capable of oscillating by the magnetic spring formed by core 14 around which coil 12 is wound and the one or more magnets, and vibration actuator 1 has an asymmetric, nonlinear frequency response.

The frequency response of vibration actuator 1 is that a frequency waveform sharply rises at a predetermined low frequency (a low input frequency), exceeds a set G value, reaches a maximum G value of the risen frequency waveform, and then decreases, while being gently inclined, without decreasing sharply. Frequency waveforms Q01, Q11, and Q21 illustrated in FIG. 10 correspond to graphs Q0, Q1, and Q2 of spring constant $K_{sp}$ of FIG. 9, respectively.

Vibration actuator 1 has a resonance frequency indicated by frequency waveform Q21 by a spring constant (indicated by graph Q2). Note that, vibration actuator 1 may also have a resonance frequency indicated by frequency waveform Q11 by a spring constant (indicated by graph Q1).

FIG. 10 is a diagram illustrating the frequency response of the vibration actuator according to Embodiment 1 of the present invention, and indicates, as the frequency response, the frequency waveforms (Q11 and Q21) of vibration actuator 1. The frequency waveforms (Q11 and Q21) each have a frequency band (W1 and W2, respectively) in which a G value greater than or equal to a set G value is output. In comparison with a resonance frequency having a linear characteristic, the frequency bands (W1 and W2) are wide frequency band in which a G value greater than or equal to a set G value is output.

In the present embodiment, vibration actuator 1 has spring constant $K_{sp}$ indicated by graph Q2, includes core 14 and the one or more magnets (first magnet 30 and second magnet 40) disposed therein, and has the resonance frequency indicated by frequency waveform Q21.

Figure 11:
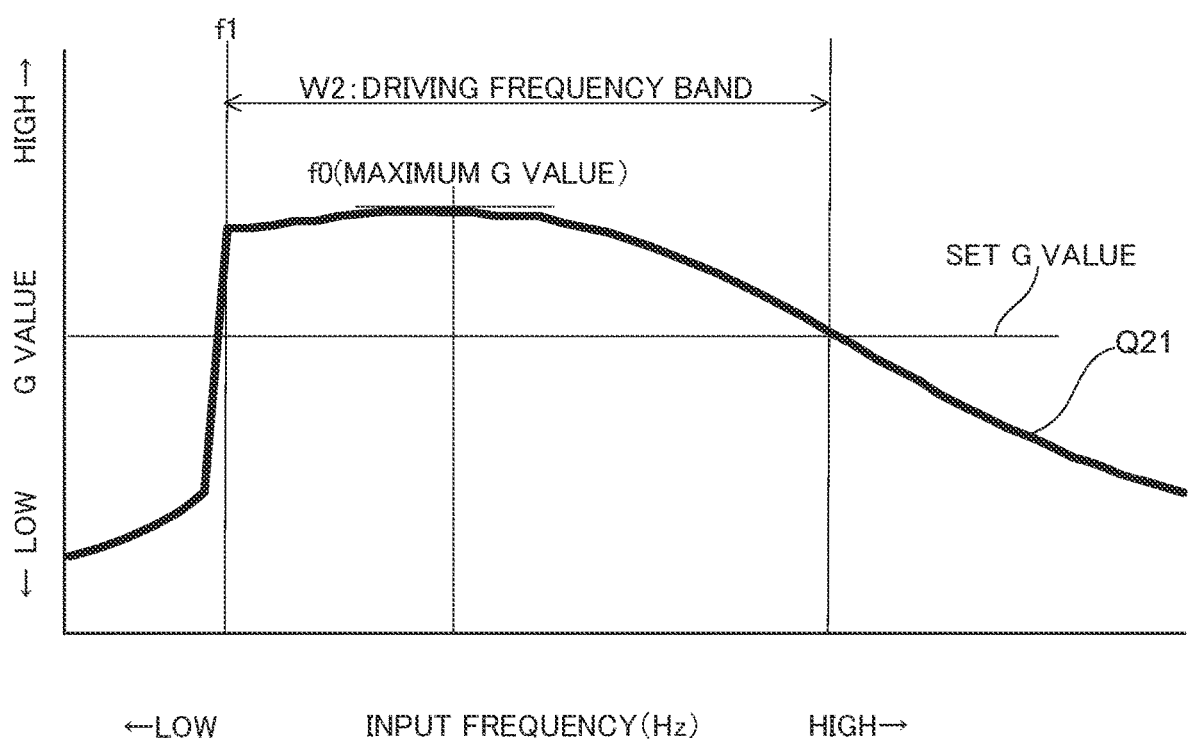
FIG. 11 illustrates the frequency response of the vibration actuator according to Embodiment 1 of the present invention illustrated in FIG. 10.

FIG. 11 is an enlarged view of frequency waveform Q21 of FIG. 10 as the frequency response of Embodiment 1.

Frequency waveform Q21 of vibration actuator 1 illustrated in FIG. 11 has a characteristic that the frequency waveform leads from rising frequency f1, which is a low input frequency and at which the G value sharply rises from a low value, to resonance point f0 at which the G value is higher than that at rising frequency f1 as the input frequency increases, and gradually decreases. Note that, a G value greater than or equal to a set G value cannot be output in the band on the left side from rising frequency f1 and the band therefore cannot be used.

Due to the frequency response indicated by frequency waveform Q21, frequency waveform Q21 includes frequency band W2 which is wide and in which the G value is greater than or equal to a set G value in comparison with a resonance frequency of a symmetric, linear structure (see frequency waveform Q01 in FIG. 10). Note that, it has been described that the frequency response of vibration actuator 1 is indicated by frequency waveform Q21 including frequency band W2, but the frequency response of vibration actuator 1 may also be indicated by frequency waveform Q11 including frequency band W1.

Frequency bands W1 and W2 are frequency bands of different sizes due to the gap (see G1 and G2 in FIGS. 7B and 7C) between core 14 and the one or more magnets (in particular, second magnet 40). Frequency bands W1 and W2 in which resonance is possible are bands wider than frequency band W0 of the frequency (graph Q0) having a linear structure and using a spring.

Further, in frequency band W2, the difference between the spring constant at the time of the reference state, that is, at the time of the oscillation angle of 0° and the spring constant at the time of the maximum oscillation is greater than that in frequency band W1. Thus, frequency band W2 has a wider band than frequency band W1, and allows resonance at different input frequencies.

The frequency response of vibration actuator 1 is asymmetric since movable body 10 is moved by using a magnetic spring.

It will be described with reference to FIG. 12 that the frequency response (resonance frequency) of vibration actuator 1 has an asymmetric configuration.

Figure 12:
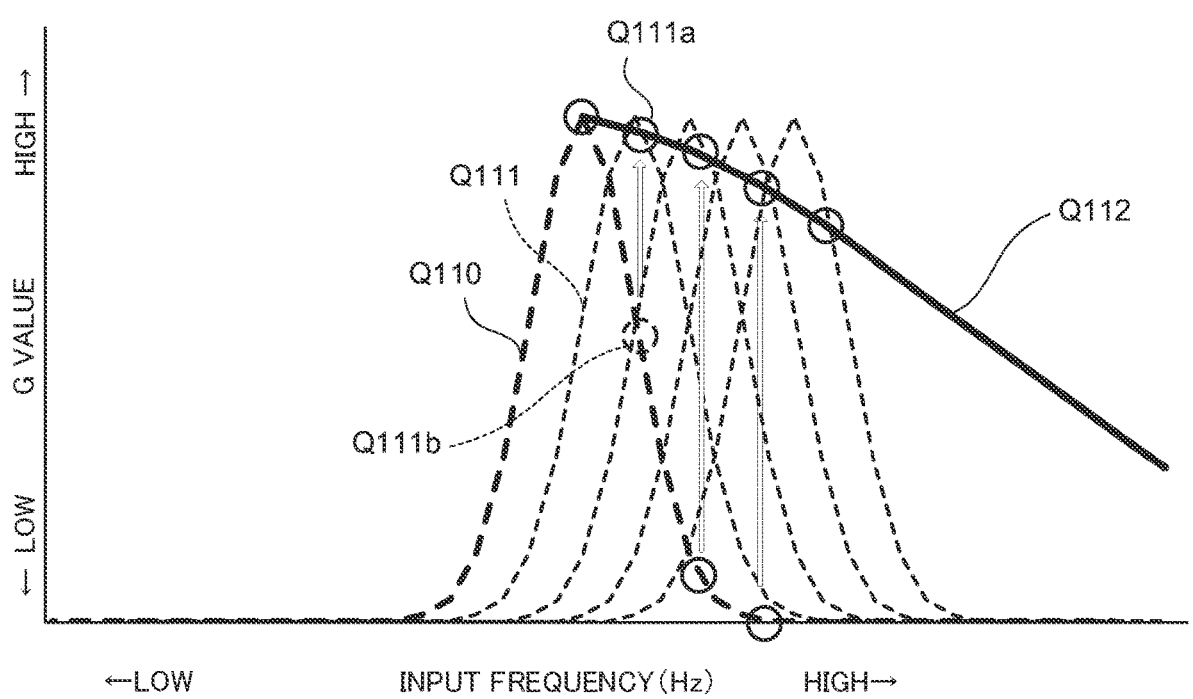
FIG. 12 is a diagram provided for describing the frequency response of the vibration actuator according to Embodiment 1 of the present invention.
Figure 13:
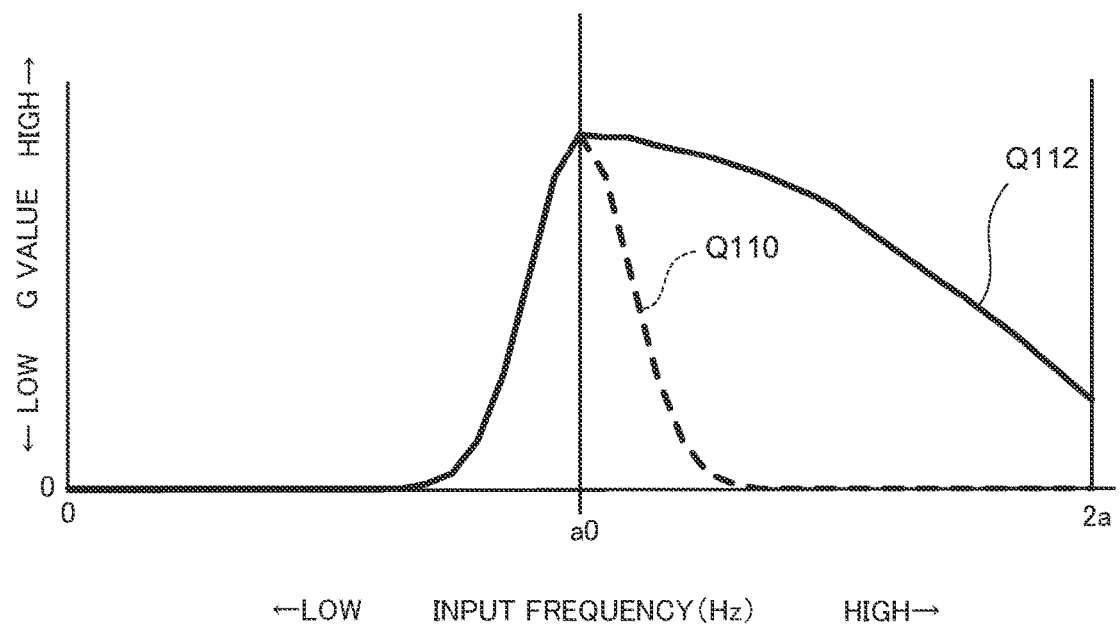
FIG. 13 illustrates the frequency response of the vibration actuator according to Embodiment 1 of the present invention.

FIG. 12 is a diagram provided for describing the frequency response of the vibration actuator according to Embodiment 1 of the present invention, and illustrates a relationship between a nonlinear part of a frequency response waveform and the spring constant. Note that, the frequency waveform illustrated in FIG. 12 is frequency waveform Q11. Here, a description will be made by using frequency waveform Q11 since frequency waveform Q21 is configured in the same manner as frequency waveform Q11 except for the difference in the gap.

In vibration actuator 1, when a driving signal (corresponding to a signal or an input frequency of the lowest frequency) is imparted (a driving current is energized) from a low frequency side, operation of resonance starts at the time of the maximum oscillation (which is indicated by frequency waveform Q110). Then, signals of frequencies (input frequencies) larger than the lowest frequency indicated by frequency waveform Q110 are sequentially imparted. Note that, in FIG. 12, input frequencies to be imparted sequentially with high frequencies are indicated by resonance frequencies (broken lines).

The amplitude of a signal to be imparted (input frequency) become smaller as the frequency becomes higher, which is namely synonymous with the gap becoming narrower, and an applied signal (resonance frequency of input frequency) increases (see position Q111a of the maximum G value of frequency waveform Q111). Specifically, when the frequency of the vibration actuator remains the frequency having a linear structure indicated by frequency waveform Q110, the G value should be at position Q11b significantly lower from the position of the maximum amplitude, but does not decrease enough and is located near the maximum G value of the lowest frequency, and a G value indicated by position Q111a is output. When the above operation is repeated and signals of high frequencies are sequentially imparted, the G value indicated by curved line Q112 is output.

When the amplitude of a driving signal to be input becomes smaller as the frequency becomes higher, spring constant $K_{sp}$ increases and the resonance frequency decreases in curved line Q112 that is gentle without decreasing sharply as illustrated in FIG. 12. Thus, the vibration actuator comes to have a frequency response having a nonlinear structure illustrated in FIG. 13.

Curved line Q112 described above can have a larger driving frequency band (for example, frequency band W2 in FIG. 10) since a distance between different frequencies in a lateral axis direction can be increased as a difference between the spring constant at the time of the oscillation angle of 0° and the spring constant at the time of the maximum oscillation is larger. That is, curved line Q112 makes it possible to change an inclination from rising frequency f1 substantially horizontally by adjusting a gap between core 14 and the one or more magnets (in particular, second magnet 40) at an oscillation angle, and has the resonance frequency response indicated by frequency waveform Q21 illustrated in FIG. 10.

According to the present embodiment, in vibration actuator 1, the range of driving signal frequency in which a G value greater than or equal to a set G value can be output by resonance is set to be wide, that is, the band of resonance frequency is wide and a wideband state has been achieved therein.

Figure 14:
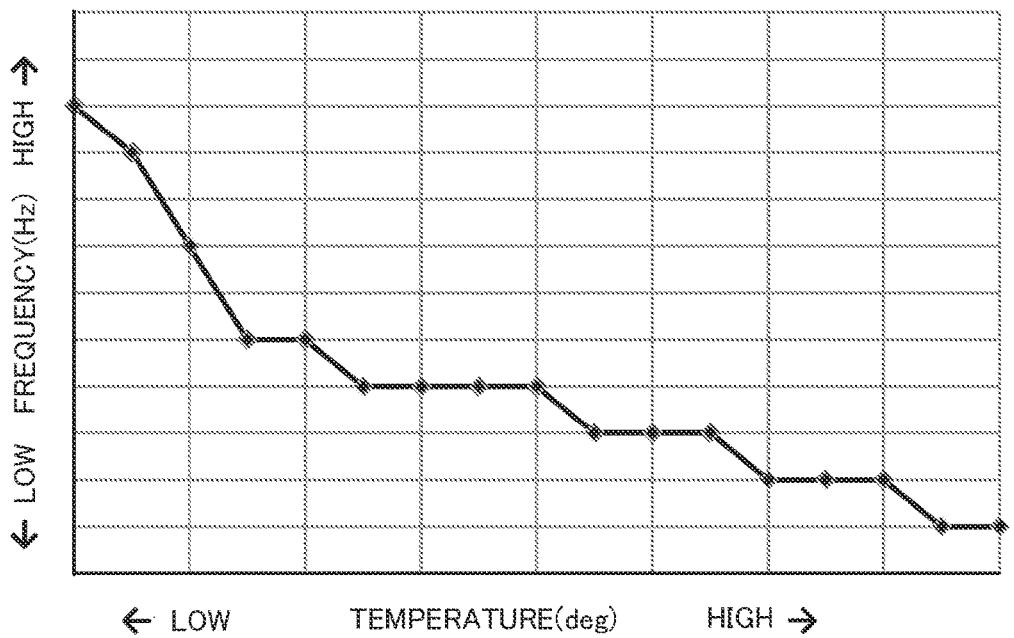
FIG. 14 illustrates a relationship between a frequency of the vibration actuator and a temperature.
Figure 15:
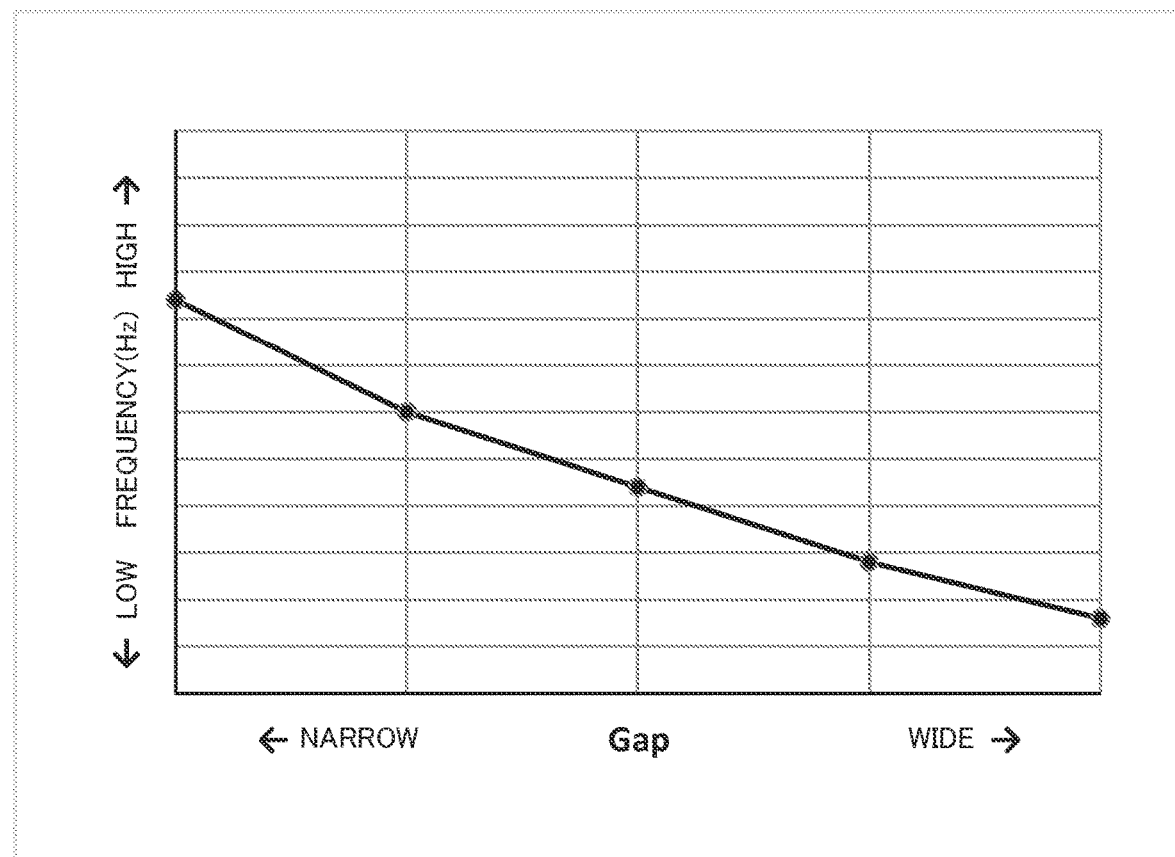
FIG. 15 illustrates a relationship between the frequency of the vibration actuator and a gap.

Thus, even when the operating environment temperature is different and a signal of a frequency (input frequency) which changes inversely proportional to the temperature as the operating environment temperature is input as illustrated in FIG. 14, it is possible to surely generate vibration in accordance with the signal. For example, even when a region including the maximum G value (resonance frequency) in frequency band W2, which is usable, of frequency waveform Q21 illustrated in FIG. 10 cannot be used due to the operating environment temperature, a high frequency band up to a frequency at which a set G value is output can be further used on the right side. Further, as illustrated in FIG. 15, even in a case where there is a variation in a set gap due to a tolerance of component dimensions, a tolerance during assembly or the like, it is possible to generate vibration by suitable resonance correspondingly.

Thus, according to the present embodiment, it is possible to achieve a decrease in the number of components and a reduction in size, to widen a frequency band in which vibration can be generated, and to give, even when currents of different frequencies are energized, sufficient physically-felt vibration to a user in accordance of each current.

Embodiment 2

Figure 16:
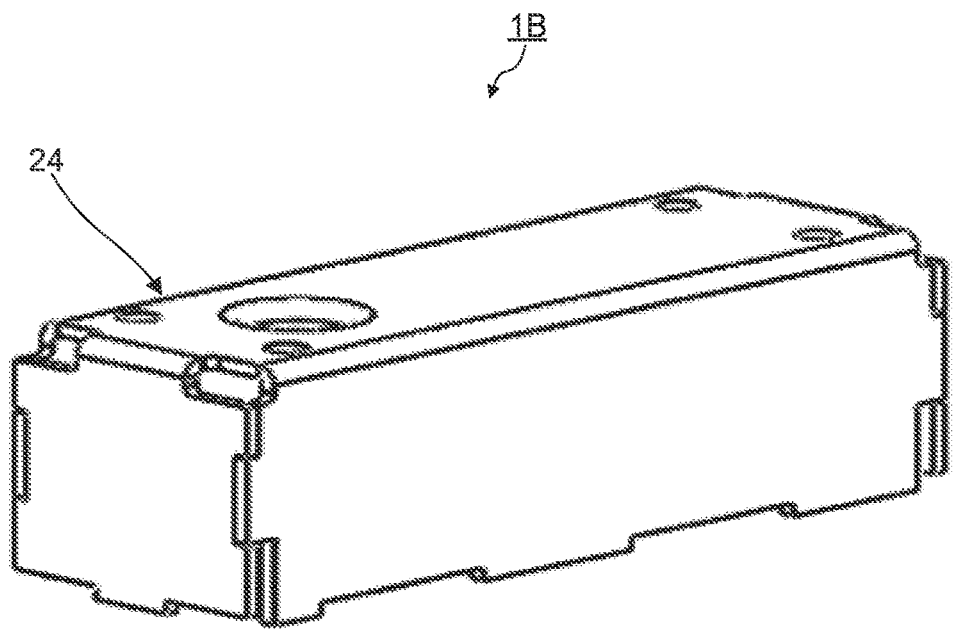
FIG. 16 is a perspective view of a vibration actuator according to Embodiment 2 of the present invention in a state in which a cover of the vibration actuator is removed.
Figure 16:
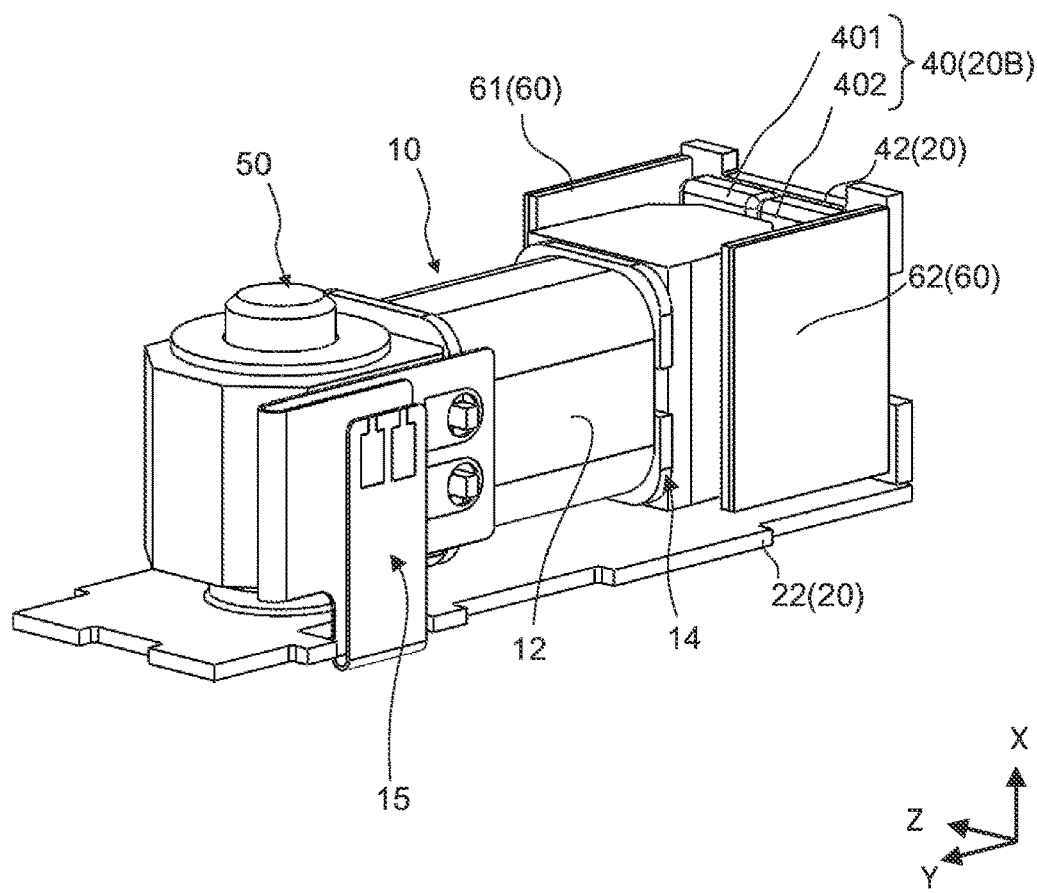
Figure 17:
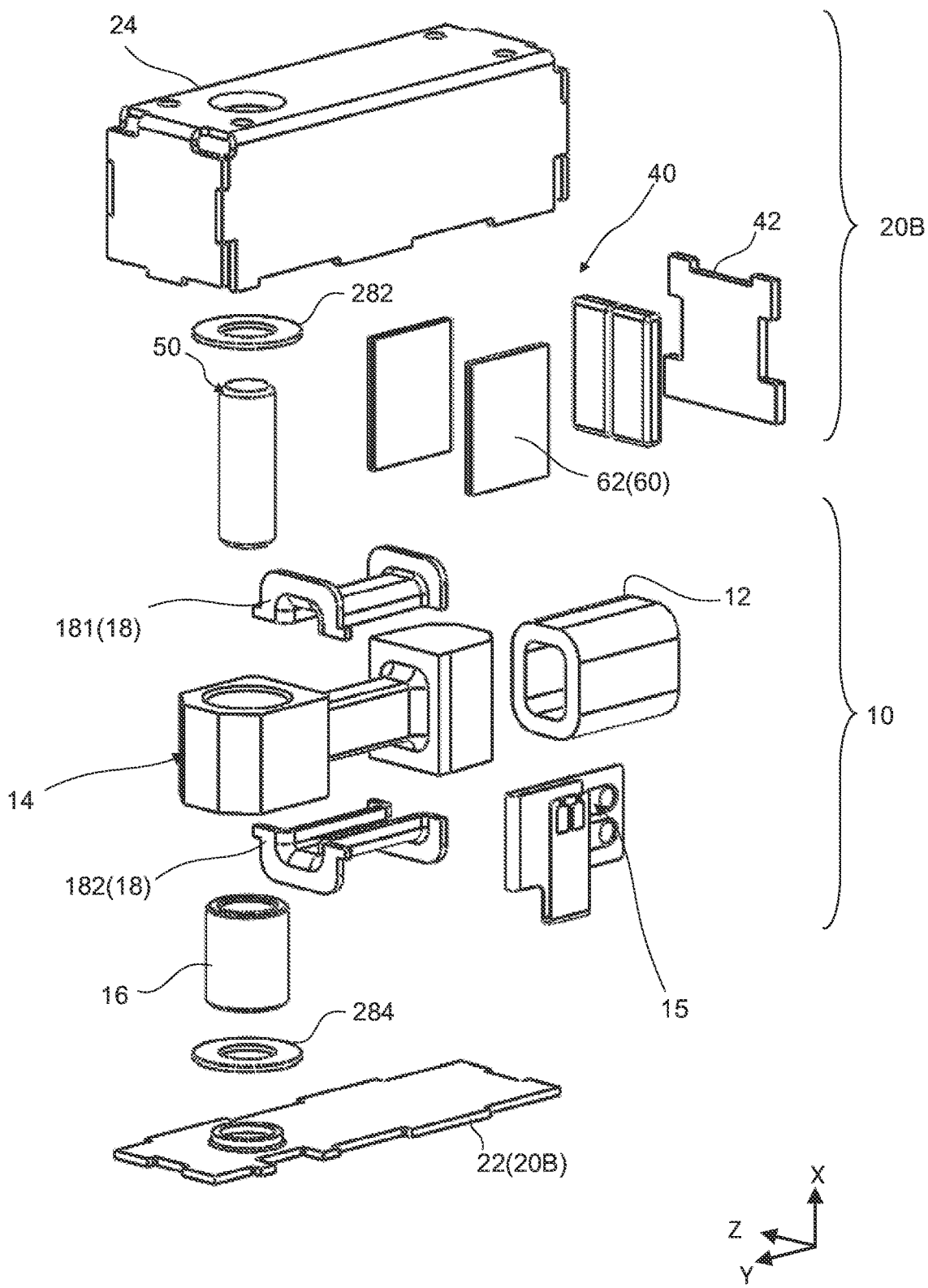
FIG. 17 is an exploded perspective view of the vibration actuator.
Figure 18:
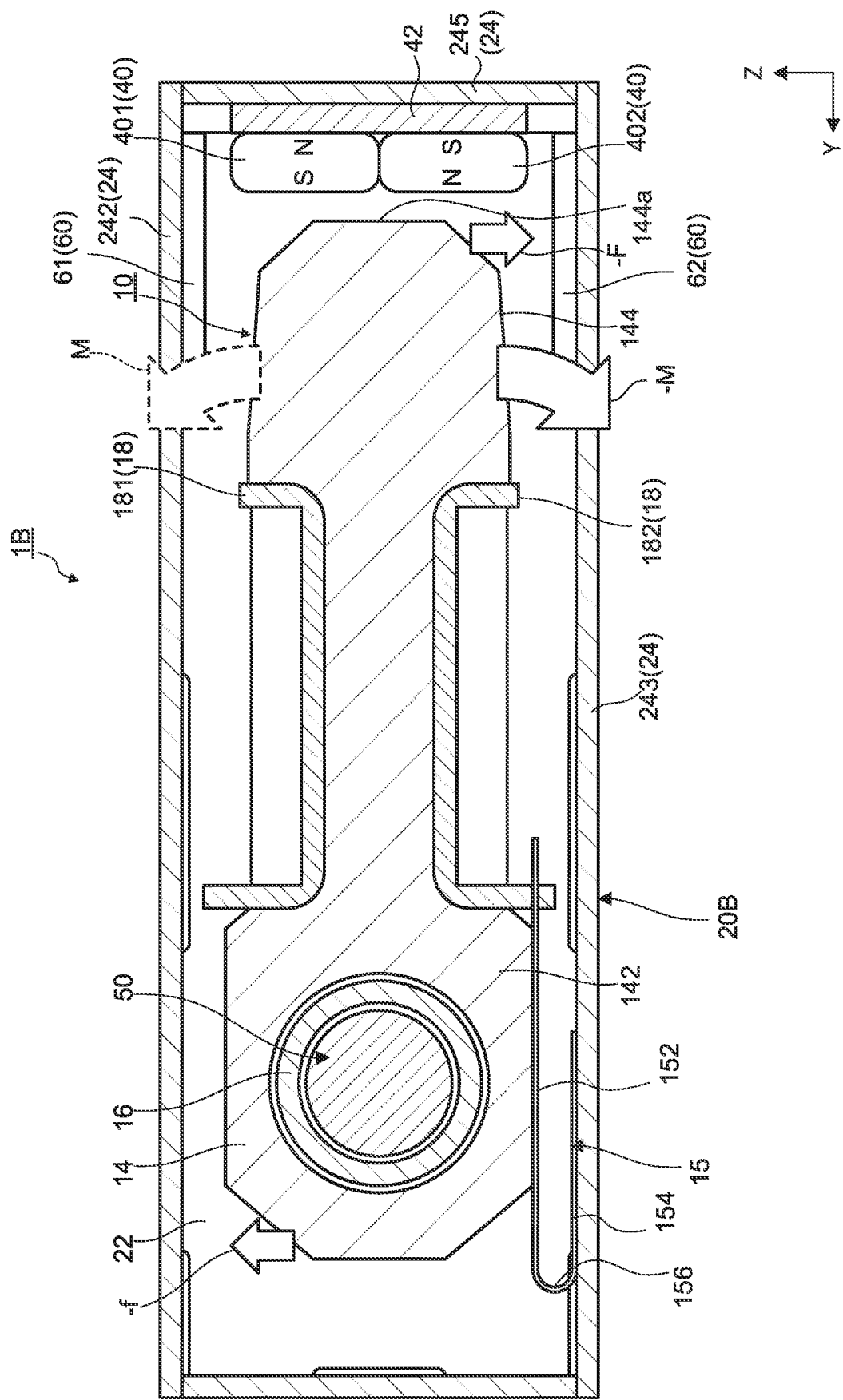
FIG. 18 is a plane sectional view of a configuration of principal parts of the vibration actuator.
Figure 19:
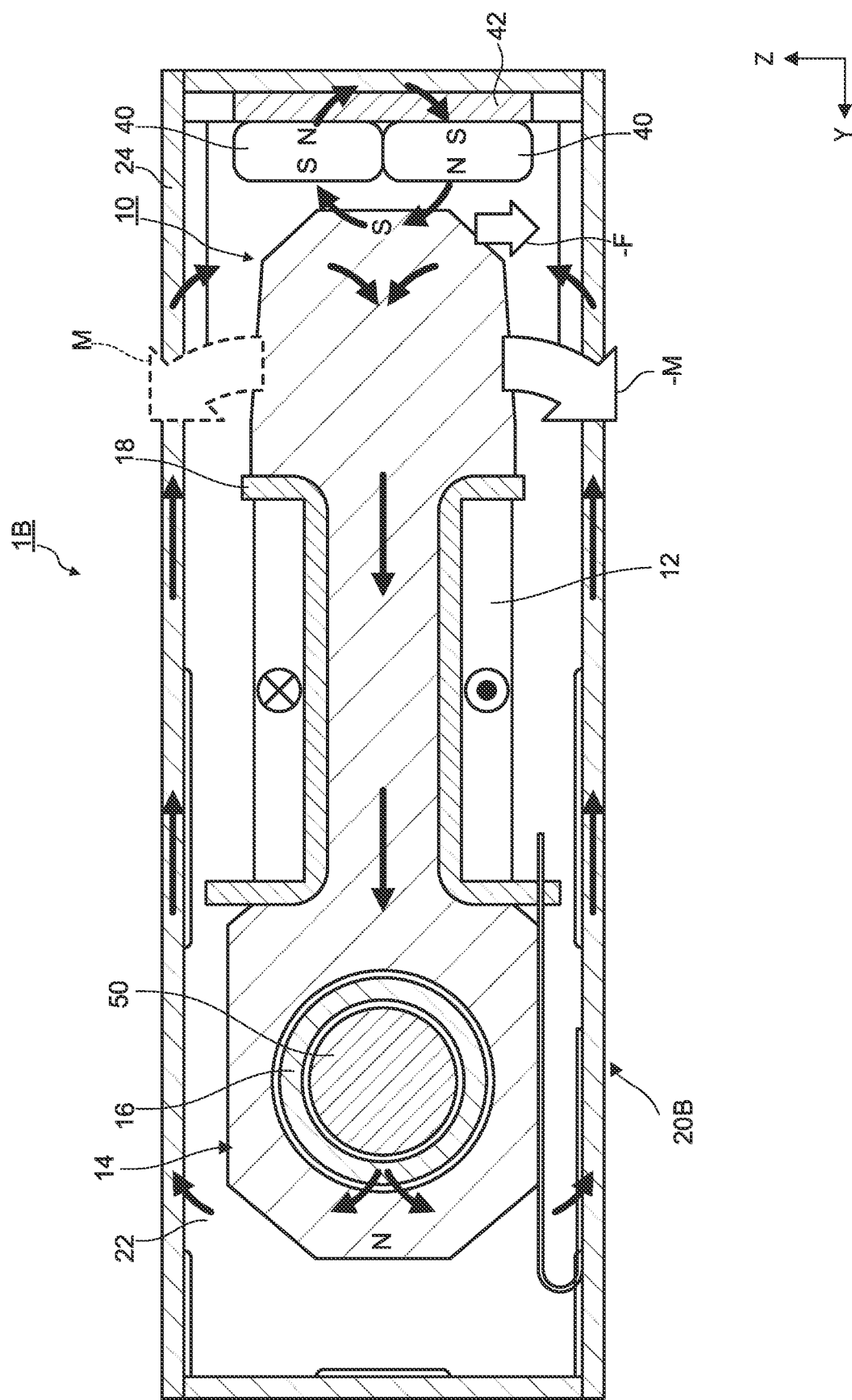
FIG. 19 illustrates a magnetic circuit of the vibration actuator.
Figure 20A:
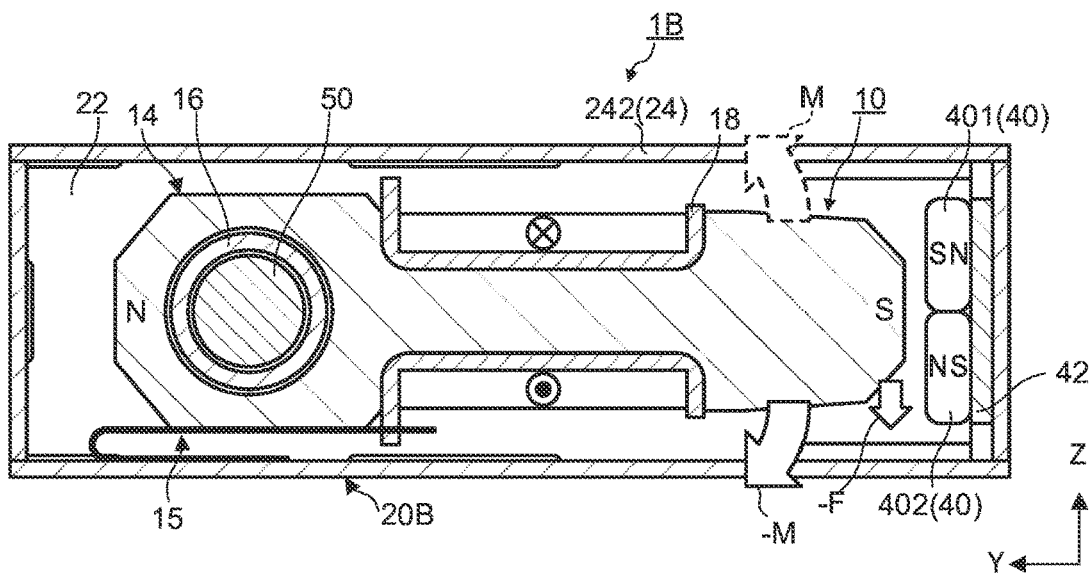
FIGS. 20A, 20B and 20C are plane sectional views illustrating operation of a movable body.
Figure 20B:
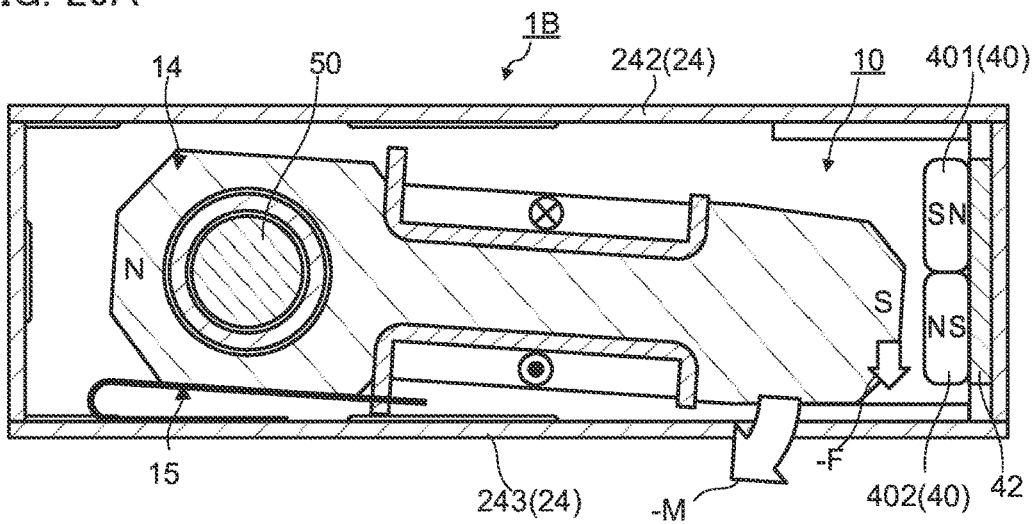
Figure 20C:
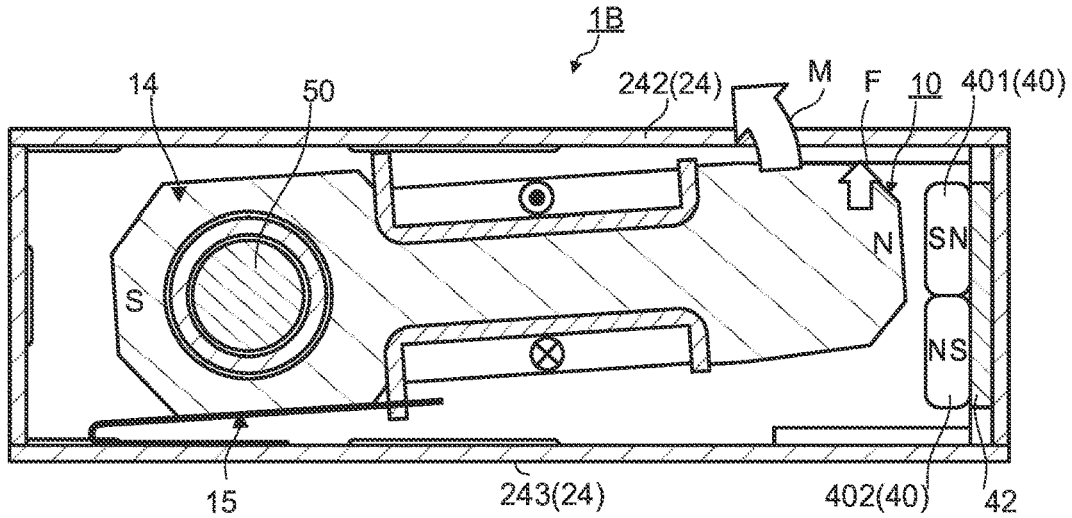

FIG. 16 is a perspective view of vibration actuator 1B according to Embodiment 2 of the present invention in a state in which a cover of vibration actuator 1B is removed, FIG. 17 is an exploded view of vibration actuator 1B, and FIG. 18 is a plane sectional view of a configuration of principal parts of vibration actuator 1B. Further, FIG. 19 illustrates a magnetic circuit of vibration actuator 1B, and FIGS. 20A to 20C are longitudinal sectional views illustrating operation of a movable body. FIG. 20A illustrates a state of movable body 10 when energization is not performed (reference state). FIG. 20B illustrates a state of movable body 10 when coil 12 is energized clockwise when viewing vibration actuator 1B from a side of a tip part of movable body 10, that is, a side of another end part 144 of core 14. FIG. 20C illustrates a state of movable body 10 when coil 12 is energized counterclockwise when viewing vibration actuator 1B from the side of the tip part of movable body 10, that is, the side of another end part 144 of core 14. Note that, vibration actuator 1B includes a magnetic spring and a frequency response (resonance frequency) similar to those of vibration actuator 1.

In comparison with vibration actuator 1, first magnet 30 and back yoke 32 are omitted from vibration actuator 1B according to the embodiment illustrated in FIGS. 16 to 20A, 20B and 23C.

Accordingly, hereinafter, a description will be given of a structural part different from that of vibration actuator 1, and a component attaining the same operation and effect as the corresponding component in vibration actuator 1 is denoted by the same name and the same reference numeral, and a description thereof will be omitted.

In the same manner as vibration actuator 1, vibration actuator 1B is mounted as a vibration generation source on an electronic apparatus such as a smartphone (see FIGS. 21 to 23), and realizes a vibration function of the electronic apparatus.

Vibration actuator 1B illustrated in FIGS. 16 to 20A, 20B, and 23C includes movable body 10, shaft part 50, and fixed body 20B. Movable body 10 is supported by fixed body 20B via shaft part 50. In the present embodiment, movable body 10 is rotatably supported by fixed body 20B such that a side of another end of movable body 10 reciprocates while shaft part 50 inserted through movable body 10 on a side of one end thereof serves as a fulcrum.

Movable body 10 is a part that vibrates (oscillates) during driving. In the present embodiment, movable body 10 includes coil 12, and core 14 around which coil 12 is wound. Fixed body 20B includes, as a magnet, second magnet 40 disposed to face another end part 144 of core 14.

Movable body 10 is movably supported with respect to fixed body 20B by a magnetic spring by means of a magnetic attraction force of second magnet 40.

In the present embodiment, movable body 10 is movably supported around shaft part 50 with respect to fixed body 20B by a magnetic spring formed by second magnet 40, coil 12, and core 14.

Movable body 10 includes coil 12, core 14 around which coil 12 is wound, bushing (bearing) 16 that is a bearing, and a coil bobbin composed of divided bobbin bodies 181 and 182. Further, fixed body 20B includes, in addition to second magnet 40, base plate 22 and case 24. In the same manner as fixed body 20, fixed body 20B includes buffer part (cushion material) 60.

Second magnet 40 moves movable body 10 by cooperation with coil 12. Second magnet 40 functions as a magnetic spring by means of a magnetic attraction force with respect to movable body 10. In the present embodiment, second magnet 40 and core 14 around which coil 12 is wound form the magnetic spring to movably support movable body 10.

Second magnet 40 is away from and facing another end part of core 14 in an axial direction of coil 12. Second magnet 40 is magnetized toward another end part 144 of core 14. In the same manner as in Embodiment 1, second magnet 40 includes, as a surface on a side facing core 14, two magnetic poles 401 and 402 that are different from each other and arranged in a direction (corresponding to the vibration direction of movable body 10) orthogonal to an extending direction of shaft part 50.

Magnetic poles 401 and 402 are disposed such that a center of core 14 of movable body 10 (here, the center is on an axis of coil 12 and corresponds to a center of the magnetic poles when coil 12 is excited) is located facing a boundary between magnetic poles 401 and 402, that is, a switching position of magnetic poles 401 and 402.

For example, as illustrated in FIGS. 17 and 18, in second magnet 40, magnetic pole 401 disposed on a side of side surface part 242 and facing movable body 10 is magnetized with the S pole, and magnetic pole 402 disposed on a side of side surface part 243 and facing movable body 10 is magnetized with the N pole.

Second magnet 40 includes a rear surface on which back yoke 42 is bonded so that an improvement in an magnetic attraction force of second magnet 40 is achieved.

As illustrated in FIGS. 20A to 20C, a magnetic flux emitted from the N pole and incident on the S pole is formed at second magnet 40 when coil 12 is not energized. When energization is not performed, another end part 144 of core 14 is attracted to both the S and N poles of second magnet 40, and is held at a switching position of magnetic poles 401 and 402 that are different from each other (the S and N poles). That is, second magnet 40 functions, together with core 14 that is a magnetic body of movable body 10, as a magnetic spring by means of a magnetic attraction force generated between second magnet 40 and core 14 to movably support movable body 10. Note that, another end part 154 of flexible substrate 15 connected to coil 12 with one end part 152 is fixed to side surface part 243.

In vibration actuator 1B, when coil 12 is not energized (reference state), another end part 144 of core 14 around which coil 12 is wound is attracted by magnetic attraction forces of both of magnetic poles 401 and 402, which are different from each other, of second magnet 40, and is held at the switching position of magnetic poles 401 and 402.

Another end part (free end part) 144 of core 14 in movable body 10 is held in the reference state only by the magnetic spring formed by using second magnet 40 of fixed body 20B. Note that, a center of a length (length in the vibration direction) orthogonal to an axial direction of another end part 144 is located on the same axis as the axis of coil 12.

In vibration actuator 1B, when energization is performed as illustrated in FIGS. 19 and 20B, another end part 144 of core 14 is magnetized to the S pole by a current flowing through coil 12.

Another end part 144 repels magnetic pole 401 of second magnet 40, is attracted to magnetic pole 402 of second magnet 40, and moves in a direction of −F.

As illustrated in FIG. 20B, another end part 144 of vibration actuator 1B moves in the direction of −F by energizing coil 12, thereby generating thrust −M that is the same rotational direction. Thus, movable body 10 rotates in a direction of thrust −M, and another end part 144 of movable body 10 moves onto the side of side surface part 243, comes into contact (specifically, collides) with side surface part 243, that is, the housing via cushion material 62, and imparts vibration to the housing.

Further, when the energization direction of coil 12 is switched to the opposite direction and energization is performed as illustrated in FIG. 20C, thrust F whose direction is opposite to movable body 10 is generated. Specifically, another end part 144 is magnetized to the N pole, is attracted to magnetic pole 401 of second magnet 40, repels magnetic pole 402 of second magnet 40, and moves in a direction of F.

As illustrated in FIG. 20C, another end part 144 of vibration actuator 1B moves in the direction of F by energizing coil 12, and moves onto a side of side surface part 242 opposite to side surface part 243. Then another end part 144 comes into contact (specifically, collides) with side surface part 242, that is, the housing via cushion material 61, and imparts vibration to the housing.

In vibration actuator 1B, in the same manner as vibration actuator 1, movable body 10 is supported to be capable of vibrating by oscillation around shaft part 50 with respect to fixed body 20B only by means of the magnetic spring using second magnet 40, coil 12, and core 14, without using an elastic member such as a plate spring. Accordingly, unlike a vibration actuator configured to support a movable body to be capable of vibrating by a metal spring as in the related art, it is possible to prevent damage due to metal fatigue or impact, which represents a problem specific to metal springs. Further, since shaft part 50 rotatably supports movable body 10 at a position shifted from a center position of movable body 10, it is possible to obtain the same operation and effect as in Embodiment 1.

<Electronic Apparatus on which Vibration Actuator is Mounted>

FIGS. 21 to 23 each illustrate an example of an electronic apparatus on which the vibration actuator is mounted. FIG. 21 illustrates an example in which the vibration actuator is mounted on game controller GC, FIG. 22 illustrates an example in which the vibration actuator is mounted on smartphone SP as a portable terminal, and FIG. 23 illustrates an example in which the vibration actuator is mounted on wearable terminal W.

Game controller GC is, for example, connected to a game machine main body by radio communication, and is used by being gripped or held by a user. Here, game controller GC has a rectangular plate shape, and the user operates game controller GC while grasping right and left sides thereof with both hands.

Game controller GC notifies a user of a command from the game machine main body by vibration. Note that, game controller GC has, although not illustrated, functions other than the command notification, for example, an input operation section with respect to the game machine main body.

Smartphone SP is, for example, a portable communication terminal such as a mobile phone and a smartphone. Smartphone SP notifies a user of an incoming call from an external communication device by vibration, and also realizes each function of smartphone SP (for example, a function that gives a feeling of operation or realism).

Wearable terminal W is worn for use by a user. Here, wearable terminal W has a ring shape, and is attached to a finger of the user. Wearable terminal W is connected to an information communication terminal (for example, a mobile phone) by radio communication. Wearable terminal W notifies the user of an incoming call or an incoming mail in the information communication terminal by vibration. Note that, wearable terminal W may have a function (for example, input operation to the information communication terminal) other than the incoming call notification.

As illustrated in FIGS. 21 to 23, each electronic apparatus such as game controller GC, smartphone SP, and wearable terminal W includes communication section 201, processing section 202, driving control section 203, and vibration actuator 100A, 100B, 100C or 100D as a driving section. Vibration actuators 100A, 100B, 100C and 100D each represent vibration actuator 1, 1A or 1B. Note that, a plurality of vibration actuators 100A and 100B are mounted on game controller GC.

In game controller GC, smartphone SP, and wearable terminal W, vibration actuators 100A, 100B, 100C and 100D are mounted, for example, such that the main face of the terminal is parallel to surfaces (here, side surface parts 242 and 243 of case 24) orthogonal to a vibration direction of vibration actuator 100A, 100B, 100C or 100D. The main surface of the electronic apparatus is a surface that comes into contact with a body surface of a user, and means, in the present embodiment, a vibration transmitting surface that comes into contact with a body surface of a user to transmit vibration.

Specifically, in game controller GC, vibration actuators 10A and 10B are mounted such that a surface with which a fingertip, a ball of a finger, a palm of a hand or the like of a user operating game controller GC comes into contact, or a surface provided with an operation section is orthogonal to the vibration direction. Further, in the case of smartphone SP, vibration actuator 100C is mounted such that a display screen (touch screen surface) is orthogonal to the vibration direction. In the case of wearable terminal W, vibration actuator 1 is mounted such that inner peripheral surface 208 of a housing having a ring shape is the main surface (vibration transmitting surface) and inner peripheral surface 208 and the XY plane are in substantially parallel (including parallel) with each other. Thus, vibration in a direction perpendicular to the main surface of game controller GC, smartphone SP or wearable terminal W is transmitted to the user.

Communication section 201 is connected to an external communication device by radio communication, receives a signal from the communication device, and outputs the signal to processing section 202. In the case of game controller GC, the external communication device is a game machine main body as an information communication terminal, and communication is performed in accordance with a short-range radio communication standard such as Bluetooth (registered trademark). In the case of smartphone SP, the external communication device is, for example, a base station, and communication is performed in accordance with mobile communications standards.

Further, in the case of wearable terminal W, the external communication device is, for example, an information communication terminal such as a mobile phone, smartphone and a portable game terminal, and communication is performed in accordance with a short-distance radio communication standard such as Bluetooth (registered trademark).

Processing section 202 converts an input signal into a driving signal for driving vibration actuator 100A, 100B, 100C or 100D by a conversion circuit section (illustration is omitted), and outputs the driving signal to driving control section 203. Note that, in smartphone SP, processing section 202 generates a driving signal based not only on a signal input from communication section 201 but also on a signal input from various function sections (illustration is omitted; for example, an operation section such as a touch screen).

Driving control section 203 is connected to vibration actuator 100A, 100B, 100C or 100D, and a circuit for driving vibration actuator 100A, 100B, 100C or 100D is mounted thereon. Driving control section 203 provides vibration actuator 100A, 100B, 100C or 100D with a driving signal.

Vibration actuator 100A, 100B, 100C or 100D is driven in accordance with a driving signal from driving control section 203. Specifically, in vibration actuator 100A, 100B, 100C or 100D, movable body 10 vibrates in a direction orthogonal to the main surface of game controller GC, smartphone SP, or wearable terminal W.

Since movable body 10 comes into contact with side surface part 242 or 243 of case 24 via cushion material 61 or 62 every time movable body 10 vibrates, an impact on surface part 242 or 243 of case 24 (that is, an impact on the housing) accompanied by the vibration of movable body 10 is transmitted directly to a user as vibration. In particular, in the case of game controller GC, the plurality of vibration actuators 10A and 10B are mounted thereon so that one of the plurality of vibration actuators 10A and 10B can be driven or both thereof can be driven at the same time, depending on an input driving signal.

Since vibration perpendicular to a body surface of a user which comes into contact with game controller GC, smartphone SP or wearable terminal W is transmitted to the body surface of the user, sufficient physically-felt vibration can be given to the user. In game controller GC, body-felt vibration can be given to the user with one or both of vibration actuators 10A and 10B, and vibration with a high expression capability can be given, such as at least selectively giving strong vibration or weak vibration.

Hereinabove, the invention made by the present inventors has been specifically described based on the embodiments. However, the present invention is not limited to the above-described embodiments and modifications can be made without departing from the gist thereof.

Further, for example, it is also preferable that the vibration actuator according to the present invention be applied to a portable apparatus (for example, a portable information terminal, such as a tablet PC, and a portable game terminal) other than game controller GC, smartphone SP, and wearable terminal W indicated in the embodiments. Further, vibration actuators 1, 1A and 1B in the present embodiments can also be used for, in addition to the portable apparatus described above, an electric cosmetic tool such as a facial massage machine that requires vibration.

It should be understood that the embodiments disclosed herein are illustrative in every respect and not limitative. The scope of the present invention is specified not by the foregoing description but by the claims, and is intended to include all modifications in so far as they are within the scope of the appended claims or the equivalents thereof.

INDUSTRIAL APPLICABILITY

The vibration actuator according to the present invention is small without an increase in size, is capable of giving, even when currents of different frequencies are energized, sufficient physically-felt vibration to a user in accordance of each current, and is useful as being equipped in an electronic apparatus such as a game controller, a smartphone or a wearable terminal.

REFERENCE SIGNS LIST 1, 1A, 1B, 100A, 100B, 100C, 100D Vibration actuator
10 Movable body
12 Coil
14 Core
15 Flexible substrate
16 Bushing
18 Coil bobbin
20, 20B Fixed body
22 Base plate
23 Shaft fixing part
24 Case
30, 30A First magnet
32, 42 Back yoke
40 Second magnet (magnet)
50 Shaft part
60 Buffer part
61, 62 Cushion material
142, 152 One end part
144 Another end part (tip part)
154 Another end part
142a End surface
144a End surface (tip part)
156 Curved part
181, 182 Divided bobbin body
201 Communication section
202 Processing section
203 Driving control section
208 Inner peripheral surface
241 Bottom surface part
242, 243 Side surface part
244 One end surface part
245 Another end surface part
282, 284 Washer
301, 302, 401, 402 Magnetic pole

The invention claimed is:

1. A vibration actuator, comprising:
a movable body including a core that is bar-shaped, a coil wound around on a bobbin externally applied between a tip part and a base end part of the core, the core extending on the coil axis of the coil,
a fixed body including one or more magnets disposed away from and facing the tip part of the core; and
a shaft part rotatably supporting the movable body at a position shifted from a longitudinal center of the core to a side of the base end part of the core, the vibration actuator generating vibration by oscillation of the tip part of the core around the shaft part with respect to the one or more magnets by energizing the coil, wherein
the one or more magnets are arranged in an oscillation direction of the movable body, each of the one or more magnets including two magnetic poles magnetized in a direction facing the tip part of the core, the one or more magnets, and the core forming a magnetic spring, the magnetic spring energizes the tip part of the core to be located at a position facing a switching position of the two magnetic poles and serving as a reference position, and
the core and the one or more magnets are disposed such that the magnetic spring has a spring constant that is largest when the tip part of the core is located at the reference position with respect to the one or more magnets, and that becomes smaller as the tip part of the core becomes away from the reference position by oscillation.

2. The vibration actuator according to claim 1, wherein the spring constant when the tip part of the core oscillates from the reference position and is located at a position of a maximum oscillation angle is between 0.9 and 0.95 in a case where the spring constant when the tip part of the core is located at the reference position is set to 1.

3. The vibration actuator according to claim 1, wherein the magnetic spring causes a frequency response in which a frequency at a resonance point of a resonance frequency is higher than a frequency when rising occurs from a low frequency side.

4. An electronic apparatus on which the vibration actuator according to claim 1 is mounted.

5. The vibration actuator according to claim 1, wherein the two magnetic poles are arranged in the axial direction of the coil with respect to the core and toward the tip of the core.

6. The vibration actuator according to claim 1, wherein the switching position is arranged to be opposite the center of the magnetic poles at the tip of the core.

7. The vibration actuator according to claim 1, wherein the magnet has a first magnet and a second magnet arranged so that the core is sandwiched in the axial direction of the coil.

8. The vibration actuator according to claim 1, wherein the bobbin is composed of a plurality of divided bobbin bodies that are attached to the core from the outside to sandwich the core.

9. The vibration actuator according to claim 1, wherein the bobbin is composed of a resin material.

10. The vibration actuator according to claim 1, wherein the fixed body is provided with buffer parts with which the tip part of the core contacts.

11. The vibration actuator according to claim 1, wherein the spring constant when the tip part of the core oscillates from the reference position and is located at a position of a maximum oscillation angle is less than or equal to 0.9 in a case where the spring constant when the tip part of the core is located at the reference position is set to 1.

12. The vibration actuator according to claim 11, wherein the spring constant when the tip part of the core oscillates from the reference position and is located at the position of the maximum oscillation angle is greater than or equal to 0.3 and not greater than 0.6 in a case where the spring constant when the tip part of the core is located at the reference position is set to 1.

* * * * *